US 8,416,931 B2

(12) United States Patent
Fiorentino

(10) Patent No.: US 8,416,931 B2
(45) Date of Patent: Apr. 9, 2013

(54) SYSTEM AND METHOD FOR THE MANAGEMENT OF CREDIT-DEBIT OPERATIONS IN ACCOUNTS RELATED TO TELECOMMUNICATIONS SERVICES

(76) Inventor: Marco Fiorentino, Milan (IT)

( * ) Notice: Subject to any disclaimer, the term of this patent is extended or adjusted under 35 U.S.C. 154(b) by 0 days.

(21) Appl. No.: 12/514,908

(22) PCT Filed: Nov. 14, 2006

(86) PCT No.: PCT/IT2006/000793
§ 371 (c)(1),
(2), (4) Date: May 14, 2009

(87) PCT Pub. No.: WO2008/059537
PCT Pub. Date: May 22, 2008

(65) Prior Publication Data
US 2010/0080370 A1 Apr. 1, 2010

(51) Int. Cl.
*H04M 1/00* (2006.01)
*H04M 15/00* (2006.01)
*H04M 11/00* (2006.01)
*H04W 4/00* (2009.01)

(52) U.S. Cl. .............. 379/114.01; 379/350; 379/114.02; 379/114.03; 379/114.2; 379/114.17; 455/405; 455/406; 455/461

(58) Field of Classification Search .......... 455/406–408; 379/114.01–114.03, 114.17, 114.2
See application file for complete search history.

(56) References Cited

U.S. PATENT DOCUMENTS

| 6,064,666 A | 5/2000 | Willner et al. |
| 6,373,817 B1 | 4/2002 | Kung et al. |
| 7,391,855 B2 * | 6/2008 | Winstead et al. ........ 379/114.21 |
| 2005/0111641 A1 * | 5/2005 | Koskinen et al. .......... 379/114.2 |
| 2007/0189496 A1 * | 8/2007 | Kahn ............................ 379/350 |

FOREIGN PATENT DOCUMENTS
WO  WO 01/60045 A2  8/2001

* cited by examiner

*Primary Examiner* — Wesley Kim
(74) *Attorney, Agent, or Firm* — Scully, Scott, Murphy & Presser, P.C.

(57) ABSTRACT

A method and a system for the management of telecommunication services provided by an operator to users and of telecommunication services, the method comprising: assigning a subscriber network identifier (IS) to each subscribed user; monitoring inbound communications toward the subscriber network identifiers (IS) assigned to subscribed users; creating, by virtue of means for creating and managing virtual accounts, a virtual account (CV) registered to each network identifier originating communications (IC); informing, by virtue of information means, at least the user or of telecommunication services who originates the communication toward the subscriber network identifier (IS) and/or the registrant of the network identifier originating communications (IC) of the existence and/or balance of the virtual account (CV). The telecommunication service management system comprises means for implementing the method.

20 Claims, 10 Drawing Sheets

SYSTEM AND METHOD FOR THE MANAGEMENT OF CREDIT-DEBIT OPERATIONS IN ACCOUNTS RELATED TO TELECOMMUNICATIONS SERVICES

TECHNICAL FIELD

The present invention relates to a system and a method for the management of telecommunication services and to a method for creating a variable and progressively incremental group of users of telecommunication services provided by an Operator.

The expression "telecommunication services" is understood to reference in general any process based on the exchange of information between remote users of one or more operators, in which a first user begins the process by sending a "call" to establish communication with at least one second user.

These services can be for example of the type of telephony, videotelephony, or others.

BACKGROUND ART

It is known that an increasing number of telecommunication service operators intend to acquire new customers by launching massive advertising campaigns in order to announce to potential users the benefits they would have if they became their clients. These benefits can be of the one-off financial (for example a sign-up bonus), recurring (for example a discount on any subscription tariffs) or tariff-related (for example, tariff discounts for outbound calls).

In some cases, the incentives also relate to inbound calls; the operator's subscriber is granted a discount/bonus/credit on the basis of the number of calls/messages or of the duration of the calls/size of the messages received from callers.

The worldwide user base of these services is served by an extremely large number of operators, which compete to acquire users but at the same time, generally but not exclusively, interconnect their own networks with each other so that the user of one operator can reach the user of any other operator and vice versa. Each operator assigns to its own users the numbers/addresses by means of which said users can be reached by other users. Generally, each operator establishes the tariffs for the calls originating from its own users toward other users; if the calling party and the called party are not served by the same operator, the operator of the calling party must pay to the operator of the called party a tariff for termination of the call on the network of said operator.

The dominant compensation mechanism among operators is known as Transit Model and entails that each operator establishes the tariff charged to other operators for terminating calls toward said operator's own users, the so-called Interconnection Tariff.

For example, an Operator A assigns to its users the numbers at which they can be reached. Operator A sets the tariffs applied to its own users for calls toward other users, and finally Operator A negotiates with operators B, C and D the Interconnection Tariffs that it will have to grant them in order to terminate calls toward users of B, C and D, and the Interconnection Tariffs that B, C and D shall have to grant to Operator A in order to terminate calls to users of A.

Termination Tariffs are negotiated among Operators and/or set by regulatory bodies. Termination toward terminals of mobile telephone networks tends to be much more expensive than termination toward terminals of fixed telephone networks, which in turn tends to be more expensive than termination toward VOIP terminals. In this last case, the called user in fact already bears the cost of the connection of his own terminal to the Internet, and therefore the termination cost borne by an Operator which is also already connected to the Internet is substantially nil.

The Termination Tariff toward a given fixed or mobile telephone network can be a single tariff or can be differentiated into two values, one for peak periods and one for evening periods and holidays. This is generally the only element of flexibility of the total amount of the tariff: there are no mechanisms for changing from call to call the Interconnection Tariff toward a given Number at a given time.

In some cases, the mechanism for compensation among Operators is based on the Origination Regime, whereby the tariff applied to a calling party who is a subscribed user of a third-party operator toward one's numbers is decided by the operator on which the call terminates, which compensates the operator of the calling party for carrying the call within his network. The tariff applied for this transport is typically independent of the tariff applied to the calling party. Since the calling party generally does not have an existing direct relation with the operator of the called party, this last operator must almost necessarily delegate invoicing to the operator of the calling party, which instead has by definition an existing relation with the calling party.

It should be noted that also in this case, the tariff applied to the calling party is inflexible: at a given time, only one tariff can be applied for calls toward a given number and it is not possible to vary the tariff on a call by call basis.

Moreover, in contrast with the Termination Regime, the Origination Regime is not universally accepted by Operators but is generally used within individual countries and only for particular types of traffic, such as for example dial-up Internet access by means of nongeographical numbers.

Since customers of telecommunication services are served by a plurality of operators, inevitably some of the calls originate from an operator different from the operator on which they terminate. It is therefore evident that an operator has no way to control at all times and at will the tariff applied to the calling party, since in the case of Termination Tariff it is the operator of the calling party that decides, whereas in the less frequent case of the Origination Regime it is not forseen for the called party operator the possibility to vary tariff applied to the caller a given time, on a call by call basis.

In addition to the practical reasons cited above, which prevent changein at a given time, on a call by call basis, the tariff applied to the calling party, in many countries there are regulatory limitations, since it is required the end user be able to determine in advance, on the basis of the called number and of the day/time of day, the tariff for reaching a certain number. These limitations prevent changing at will, at a given time, on a call by call basis, the tariff applied to reach a given number.

There are know mechanisms for interoperability among networks of Operators that come close to achieving this goal. For example, in a case in which the calling and called party are served by two different Operators, it is known how to charge the calls to the called party instead of the calling party (toll-free numbers, collect calling) or how to split the cost between the calling party and the called party (service know in Italy as "addebito ripartito" or "shared cost"), or how to charge the costs to a third party, which in some cases pays for the call in exchange for the insertion of advertising messages. In other cases, mechanisms are described for crediting part of the cost of the call to third parties with the goal of providing systems for payment to third parties by charging the telephone bill of the calling party (premium numbers).

However, none of these mechanisms allows for example to vary arbitrarily the tariff applied for a given call to a given number at a given time when the call transits from one Operator to another Operator.

However, an Operator might have the goal and interest in influencing on a call by call basis the tariff applied at a given time to customers of other Operators who call one of its subscribed users. An operator might even find it convenient to establish a direct relationship with users of other operators.

Moreover, this feature is required in order to optimally provide various services, including for example the Follow Me Unique Number service, which is already known.

A Subscriber of the Follow Me Unique Number service generally can be reached by means of a plurality of terminals, such as for example a fixed telephone at home, a fixed telephone in the office, a cellular mobile telephone, a fixed VOIP telephone connected to the Internet by means of a fixed line, a PC provided with a VOIP client connected to the Internet over a fixed line or wireless link, a mobile telephone or a PDA provided with a VOIP client connected to the Internet via a wireless link.

Thanks to the Follow Me Unique Number service, the Subscriber gives his callers a single Unique Number instead of a Number for each of his terminals. Following a call to the Unique Number, the provider of the Follow Me Unique Number service might determine on which terminals the user is reachable at that given moment and select for example the terminal that entails the lowest cost.

The cost to reach the called party might therefore vary considerably in each instance, but the inflexibility described above does not allow the provider of the Follow Me Unique Number service to vary at a given moment the tariff applied to calling parties in accordance with the actual cost incurred to reach the called party, so that the provider may share with the calling party at least part of the saving realized when reaching the called party.

In all the cases of known systems, when the calling party is not a customer of the same operator that provides the Follow Me Unique Number service, the provider of the Follow Me Unique Number service in fact has no way to change the tariff applied to the calling party on a call by call basis at a given moment toward a given number. Assuming that the Transit Model is used, which maximizes the number of operators with which the Follow Me Unique Number service provider can interoperate, the operator will presumably set the Interconnection Tariff for the number ranges related to Unique Numbers at a value high enough to cover the cost of delivering the call to the recipient in the most expensive case (for example, delivery on a mobile telephone), or at least higher than the statistical average of costs, but it has no way to modify the tariff applied to the calling party when it is possible to reach the recipient on a less expensive terminal. As already noted, this limitation cannot be overcome even by adopting the origination regime, which would entail the additional disadvantage of limiting significantly the number of operators with which it would be possible to interoperate.

One possible solution to this problem and in general to the problem of affecting the tariff applied by a third-party operator to contact one's own clients, on a call by call basis, is to implement this function in the mechanisms for interconnection among operators.

However, this would require an agreement among all the Operators which intend to provide this service to each other and would require implementing the function itself.

It is therefore necessary to improve the known system for the management of telecommunication services with particular regard to tariffing in order to make it more flexible as well as effective and inexpensive.

DISCLOSURE OF THE INVENTION

Accordingly, the aim of the present invention is to eliminate the drawbacks noted above in known types of systems and methods for the management of telecommunication services by providing a new and improved management system and method which have maximum efficiency and flexibility in determining the actual costs and the tariffs to be applied to users.

Within this aim, an object of the invention is to overcome the difficulties arising from the technical and regulatory inflexibilities which prevent the provision of variable tariff charging at a given moment, on a call by call basis, toward a given number in a manner which is simple, transparent and inexpensive.

Another object of the invention is to provide a new system and method for the management of improved telecommunication services which allow a considerable saving on advertising costs, with consequent positive effects on management tariffs and costs.

An important object of the invention is to provide a new and efficient system and method for the management of improved telecommunication services which facilitates a quick increase in the number of registered users at low costs.

Another object of the invention is to provide a new system and method for the management of improved telecommunication services which are also safe to use, allowing reliable identification of the users who access or wish to access the services.

Another object of the invention is to provide a third-party payment service benefitting from the low credit checking costs typical of systems based on prepayment by users but at the same time not requiring prior contact between the operator and the user, or even direct contact between them in order to make a prepayment.

Still another object of the invention is to provide a new system and method for the management of improved telecommunication services which can be implemented simply and inexpensively in one or more geographical areas and/or countries with existing means and equipment and with operations which do not require complicated and time-consuming work or expensive changes to existing networks.

This aim together with these and other objectives, which will become better apparent hereinafter, are achieved by a new system and method for the management of improved telecommunication services and by a method for creating a progressively incremental variable group of users of telecommunication services provided by an Operator, according to the invention, as defined in the appended claims.

A system for the management of telecommunication services according to the invention comprises a central unit, connection means controlled by said central unit in order to establish communications inbound and outbound communications among terminals of users of telecommunication services, means for assigning a subscriber network identifier which are adapted to assign to each subscribed user at least one subscriber network identifier which allows to receive communications, and allowing terminating communications toward said subscriber on any of said telecommunication terminals; means for monitoring the inbound communications toward said subscriber network identifiers in order to identify the network identifiers originating communications, means for creating and managing virtual accounts CV which are adapted to manage debit-credit operations, said virtual accounts CV being registerable to each of the network identifiers originating communications.

According to the invention, it is also provided a method for managing telecommunication services furnished by an operator to users of telecommunication services by means of the management system according to the invention which comprises: assigning to each subscribed user a subscriber network identifier; monitoring inbound calls toward said subscriber network identifiers of subscribed users; creating, by means of virtual account creation and management means, respective virtual accounts CV registered with network identifiers originating communications, and optionally informing, via information means, at least the user of telecommunication services who originates the communication toward the subscriber network identifier and/or the assignee of the network identifier originating communications of the existence and/or balance of the virtual account CV created, registered to the network identifier originating communications.

The invention also provides a method for creating a variable and progressively incremental group of users of telecommunication services provided by an operator by assigning subscriber network identifiers, which comprises: acquiring an initial number of subscribed users; assigning to each subscribed user of said initial group of subscribed users respective subscriber network identifiers; notifying said subscriber network identifiers to current and potential users; monitoring inbound communications toward said subscriber network identifiers in order to identify network identifiers originating inbound communications; creating, as a consequence of a communication originated from one of said network identifiers originating communications toward at least one of the assigned subscriber network identifiers a virtual account CV registered to said network identifier originating communications; informing said telecommunication service users of the existence and/or balance of the virtual account CV registered to the network identifier originating communications.

BRIEF DESCRIPTION OF THE DRAWINGS

Further characteristics and advantages of the present invention will become better apparent from the detailed description of a preferred but not exclusive embodiment of some examples, illustrated by way of non-limiting example in the accompanying drawings, wherein.

WAYS OF CARRYING OUT THE INVENTION

Figure 1:
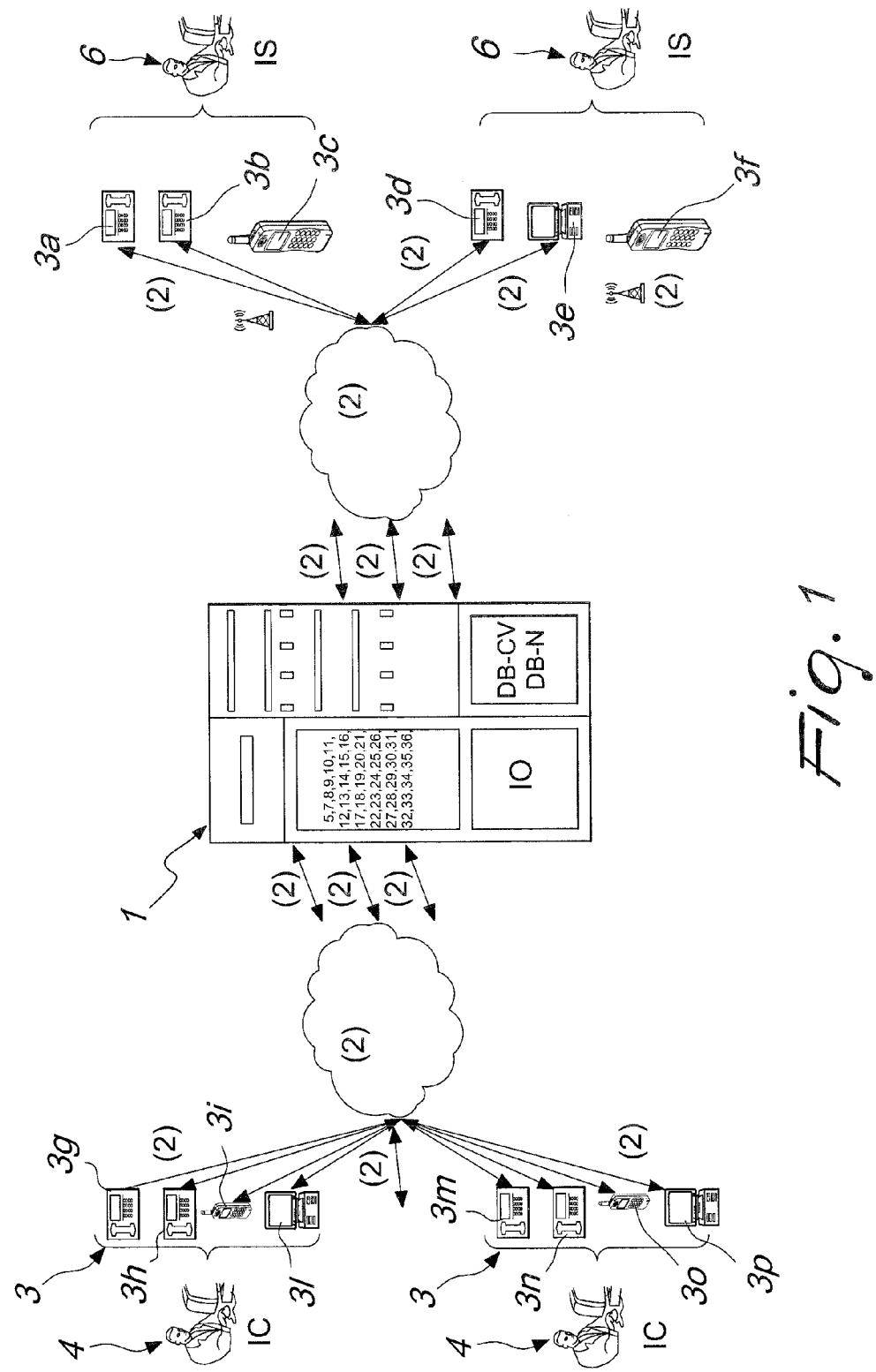
FIG. 1 is a schematic diagram of a telecommunication service management system according to the invention.
Figure 2:
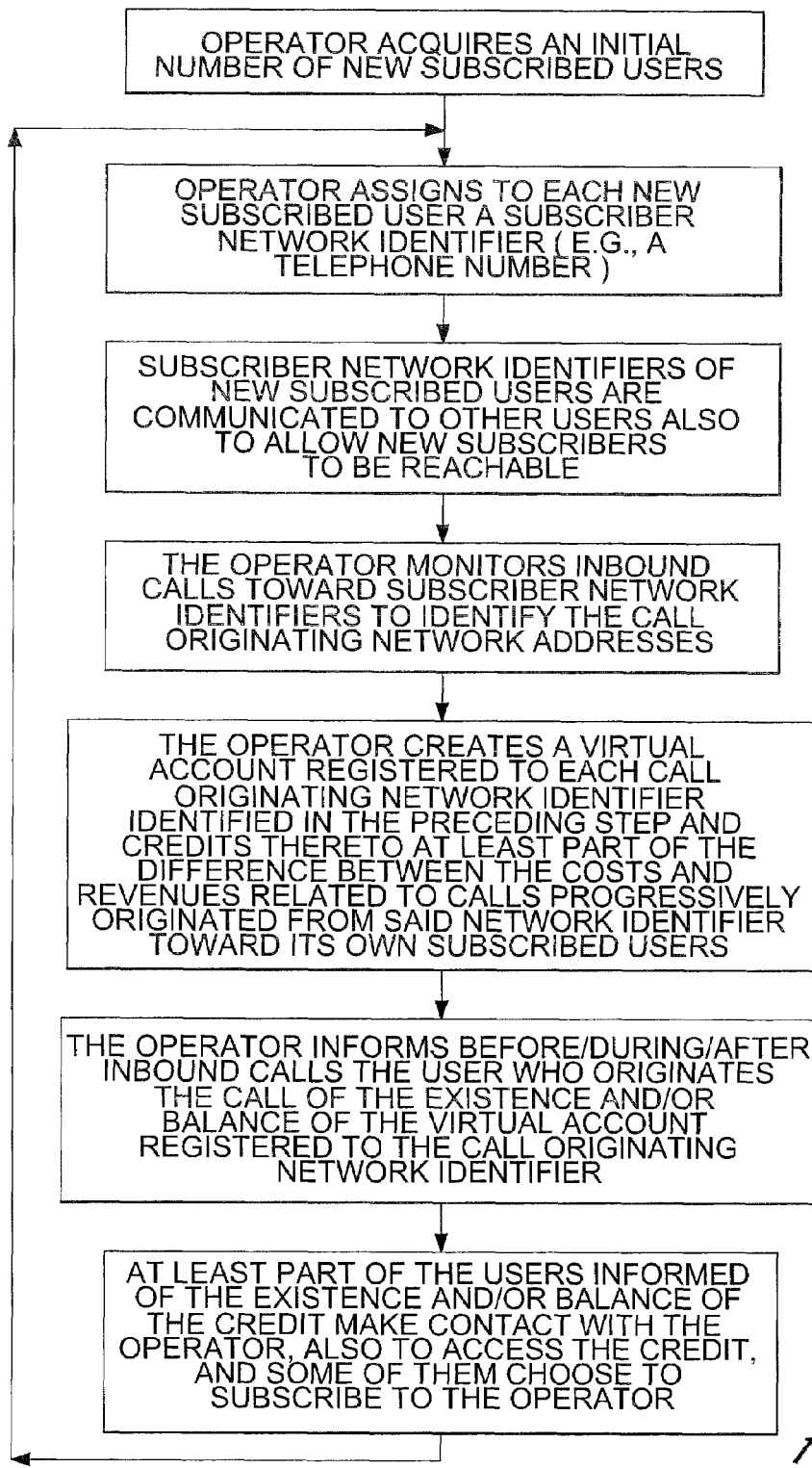
FIG. 2 is a block diagram of exemplifying steps of the generic method according to the invention.

In the description of the invention and of a preferred but not exclusive embodiment thereof, the expression "network identifier" is used to reference information which identifies a terminal, groups of terminals or in general one or more elements of a telecommunications network which are capable of receiving communications. The communication can be vocal, video, data transmission or other known suitable transmission means.

"The Operator" is understood to be a provider of telecommunication services which can assign to one or more users 6 one or more subscriber network identifiers IS.

With reference to FIGS. 1 to 8, the invention comprises a system for managing telecommunication services provided by an operator to telecommunication service users 4, 6 (for explanatory purposes, for example, the users 6 are the subscribed users of the operator, while the users 4 are served by other operators); the system comprises a central unit 1, connection means 2 which are controlled by the central unit 1 in order to provide inbound and outbound communications between terminals, generally designated by the reference numeral 3 (and designated by the reference numerals 3a-3p in the figures), of users 4, 6 of telecommunication services, means 5 for assigning a subscriber network identifier IS which are adapted to assign to each user 4, 6 at least one subscriber network identifier IS which allows to receive communications and terminate communications toward the user on any of the telecommunication terminals 3, means 7 (steps 1300-1900 of FIG. 4) for monitoring inbound communications toward the subscriber network identifiers IS in order to identify the network identifiers originating communications IC, means 8 for creating and managing (step 1800 in FIG. 4, step 15100 in FIG. 8) virtual accounts CV, said virtual accounts CV being registerable to each of the network identifiers originating communications IC. The means 8 for creating and managing the virtual account CV are adapted to manage debit-credit operations.

The expression "virtual account CV" references an account which is created and possibly debited and credited without being necessarily registered to a juridical or physical person. Usually, accounts such as for example bank accounts are in fact opened by request of the physical or juridical person to which they are registered, and the bank knows from the outset the identity of said registrant. In this case, instead, the operator creates the account without knowing the identity of the physical or juridical person that might have it at his/her disposal and without said physical or juridical person asking to create it. The account is instead opened and initially associated with a network identifier originating communications IC, and only at a later time might be associated with a physical or juridical person.

In the preferred but not exclusive embodiment of the invention, the central unit 1 can be provided with equipment such as a single electronic computer or also with a plurality of physical and/or logical units arranged in a plurality of locations. Each physical unit can be constituted by a commercially available electronic computer. The connection means 2 generically can include telephone networks of any type in use and/or the Internet, et cetera.

Generally but not exclusively, the connection means 2 for carrying communications comprise transmission means, such as for example copper or fiber-optic cables, radio links, that make it possible to carry data streams which, at the highest levels of the OSI scale (or equivalents), encode both the content of the communication and the control signals associated with said communication.

In the field of traditional telephony, the reference standards for coding voice content are ITU-T G.711 A-law and Mu-Law, while the standard generally adopted for transmitting call control signals among traditional telephony operators is SS7. There are also several standards, such as for example ISDN, which are used for signaling and coding used between the operator and the user terminal.

In the field of audio/video communications over the Internet, communication over the connection media occurs by using the TCP/IP protocol suite. On top of this suite, several standards are used to encode the signaling and content components of the communication. Protocols for encoding voice content include ITU-T G.711 A-Law and ILBC. In the case of transport over TCP/IP, the encoded audio signal is generally encapsulated by an appropriate protocol which manages synchronization and RTP retransmission problems.

For signaling, the most common protocols are SIP and H.323. Some operators (such as for example Skype) use proprietary standards based on TCP/IP transport in order to provide audio/video communication services.

The central unit 1 is capable of connecting to the connection means 2 over which the communications are made by using one or more standards. The central unit 1 controls the connection means 2 in that it reads, receives and/or transmits data from/on said means either directly or indirectly.

The central unit 1 optionally includes transcoding and conversion means (both for signaling and for the media), designated by the reference numeral 9 in FIG. 1, in order to allow communications even when the encoding standards implemented on the corresponding connection means 2 are not the same (for example means for transcoding from G.711 A-Law to ILBC, or SS7 ISUP<->SIP conversion).

Moreover, said central unit 1 also includes switching means, designated by the reference numeral 10 in FIG. 1, which allow to interconnect one or more communications received in input on the connection means 2 with one or more communications in output on the connection means 2.

The central unit 1 can also include RTP proxying means, which are already commercially available and can be used to perform switching functions in a distributed manner and to allow communications in cases of connection means on which NAT is used.

The means 5 for assigning a subscriber network identifier IS consist, in one possible implementation, of a routine which can be run on the equipment of the central unit 1 that records the association between said identifier IS and the user 6 in an appropriately provided table of a database which can be implemented on the central unit 1 (for example "CALLED NUMBERS DATABASE", shown graphically in the Annexes, which are an integral part of the present description). This table might be preloaded with all the network identifiers assigned to the operator and/or with the identifiers that have already been assigned to users by other operators but are the subject of the known procedure of Number Portability toward the operator. Actual assignment to a user 6 occurs only when in the record of said table that contains an unassigned identifier it is written to which user 6 said record is associated. Said database also includes tables which can relate subscribed users 6 to terminals 3a-3f.

It should be noted that the term "subscriber" 6 designates a user who has established a relation with the operator, for example a person who has taken out a subscription contract with the operator or has purchased prepaid services of the operator or uses the services of the operator for free.

The central unit 1 can also include means 11 which are adapted to indicate to other operators how to route communications toward the subscriber network identifiers IS. These means are already known to persons skilled in the art.

The means 7 for monitoring inbound communications toward subscriber network identifiers IS for identifying the network identifiers originating communications IC generally consist of a routine which can be run on the equipment of the central unit which reads data made available on the connection means 2 in accordance with the encoding standards of the communication control signals.

Merely by way of non-limiting example, in the case of a telephone call received from another operator by way of connection means 2 on which signaling is based on the ITU-T Q.931 standard, a routine AR4 performed by the central unit 1 reads the information related to the call originating subscriber network identifier IC from the "Calling party address" field. In the case of the SIP standard, this information is available in the "From:" field.

Network identifiers are often already disclosed to the public or, if they are not already disclosed (for example are new), they are disclosed directly by the assignees of said identifiers and/or by the Operator and/or by providers of public directories.

It should be noted that the network identifiers originating communications IC might not be available and, if available, might be the subject of rewriting or spoofing. In general, however, the availability and reliability of this information is extremely high.

As already mentioned, the system according to the invention comprises means 8 for creating and managing virtual accounts CV which can be registered to each of the network identifiers originating communications IC.

Virtual accounts CV consist usually of records which are contained, in a preferred but not exclusive embodiment of the invention, in a database DB-CV (for example "CALLING PARTY DATABASE", table "CALLINGPARTYACCOUNTS", in the annexes), implemented on the equipment of the central unit 1, and in which at least one credit amount and optionally the nature of the associated credit or credits are stored for each virtual account CV.

Therefore, the means 8 for creating and managing virtual accounts CV usually consist of routines which can be run on the equipment of the central unit 1 which generates, modifies and optionally deletes the records cited above.

The credit contained in said created accounts, i.e., the virtual accounts CV, can include one or more among cash funds, points, "frequent caller minutes" and in general any other measurable and/or exchangeable and/or convertible value means.

The subscriber network identifiers IS and the network identifiers originating communications IC may be a set of information such as any among an ITU E.164 telephone number, an alphanumeric string such as an e-mail address or an RFC 3261 SIP URI (Uniform Resource Identifier) address, or one or more ideograms such as a Chinese instant messaging address, and in general a set of information which identifies even indirectly terminals 3 of the telecommunications network, groups of terminals or in general one or more elements of a telecommunications network capable of receiving communications.

In the particular preferred but not exclusive embodiment of the invention, the subscriber network identifier IS might be a single subscriber network identifier IS, such as a single telephone number, which allows the termination of all inbound calls toward one among a plurality of telecommunication terminals 3a-3f, such as fixed telephones, mobile telephones, VOIP terminals and/or accounts, and voicemail services. For example, the subscriber of the operator might wish to be reachable by means of a single telephone number even if he/she has, or has access to, a plurality of telephones.

In this case, for example, in the preferred but not exclusive embodiment of the invention, the system can comprise means 12 (or 600 in FIG. 3, or steps 2000-3300 in FIG. 5) for selective termination of an inbound communication which, by means of a preset algorithm (AR0) establish a sequence of priorities among the terminals 3 of the subscriber 6 and which, also on the basis of this sequence, terminates the communication on one of the terminals 3.

The algorithm AR0 is advantageously preset, in a preferred but not exclusive embodiment, to be adapted to minimize termination costs by giving higher priority to the terminals 3 that have the lowest termination costs. The algorithms mentioned above can be implemented by means of routines which can be run on the equipment of the central unit 1.

The telecommunication terminals 3a-3f of each subscriber 6 might be at least two terminals among fixed telephones, mobile/cellular telephones, fixed telephones with VOIP, Internet terminals with VOIP, mobile/cellular telephones with VOIP, videotelephony terminals, and any other terminal suitable to receive data by telecommunication.

It is possible that within the scope of the embodiments in which the invention can be provided, each of the terminals 3a-3f, 3g-3p might be assigned a specific network identifier, so that said terminal can be reached and/or identified either by means of a single subscriber network identifier IS/network identifier originating communication IC or by means of its respective specific network identifier.

Means 13 (step 7450 of FIG. 7, step 15000 of FIG. 8) for tariff calculation are further provided which are adapted to calculate a difference between what can be and/or is invoiced for a communication by the operator that supplies the telecommunication services and the cost to the operator for terminating the communication.

For the sake of nonlimiting description, it is assumed that operations occur in a Termination Tariff regime.

In the case of costs higher than the revenue, the difference might be negative. The calculation means 13 can intervene not only once the communication has ended, but also during a communication, or before setting up a communication, once the tariff to reach the terminal 3 on which the communication would be terminated is known. In this last case, the purpose of preventive tariff checking might be to optionally not terminate communications in case of a negative difference (costs higher than revenue).

In the case of a communication toward one's own subscriber network identifier IS which originates from another operator, the main component that can be invoiced is the interconnection tariff negotiated with the originating operator for the termination of communications toward one's subscriber network identifiers IS.

In the case instead of a communication originating from one's own subscriber 6, the main component is what the operator can invoice to the user 6 who originates the communication. In some cases, there is also a component which can be invoiced to the user 6 to whom is assigned the subscriber network identifier IS recipient of the communication.

The costs for terminating communications might be internal, in the case of a terminal 3 connected to the operator's own network, or can also include costs to be paid to other operators, for example if it is necessary for the communication to transit or terminate through third-party operators. It should in fact be noted that the subscriber network identifier IS might correspond to one or more terminals 3 which belong to other operators or to a terminal 3 which belongs to the operator's own network but at that time is reachable only by roaming on a network of a third-party operator, thus entailing in any case a transit/termination cost.

Usually, all tariffs related to costs and revenues are applied on the basis of the extent of the communication. In the case of telephony, for example, they are a function of the duration of the call. This makes it easy to establish beforehand whether the difference between costs and revenue of a communication would be positive or negative before it occurs, regardless of its actual duration, simply by comparing the tariffs related to costs and revenues.

The calculation means 13 include routines for measuring the actual extent of the communication during and at the end of said communication (in the case of a telephone call, the duration) and routines which, at the end of the communication, on the basis of its extent, of the contractual terms and of other possible variables such as the time and the day when the communication begins and/or ends, calculates the amount that can be invoiced by the operator, the costs incurred by the operator and the difference between the two.

At least part of this difference might be credited to the virtual account CV which may be registered to the network identifier originating communications IC. In other words, by way of non-limiting example, the virtual accounts CV are credited by the differences between costs and revenues generated by communications originated from users 4 or 6 when they call the subscribers 6 of the operator, and the virtual accounts CV may be registered to the network identifiers originating communications IC which can be associated with the calling users 4 or 6, with whom the operator does not necessarily have any previously established relation (the users 4).

The difference increases as the termination costs toward the operator's own subscribers 6 decreases. For example, in the case of telephone calls terminated via the Internet on VOIP equipment, the termination cost is substantially nil.

The crediting of at least part of the difference on virtual accounts CV which may be associated with the calling users 4 or 6, can be used to encourage the calling users 4 who do not have a previously established relation with the operator to come into direct contact with said operator so as to be able to access the credit, and the operator might use this contact to encourage said users 4 to become its, optionally providing access to the credit only to those who become subscribed users 6.

Optionally, the operator can reserve part of the difference to his own called subscribed user 6, so as to give him an incentive to make himself as much as possible available on the terminals 3 that entail the lowest termination costs.

Finally, it should be noted that if the operator does not block calls which entail a negative difference (costs higher than revenues), the operator might in any case terminate the calls by drawing the difference from credit accumulated in the virtual account CV associated with the network identifier originating communications IC.

Figure 6:
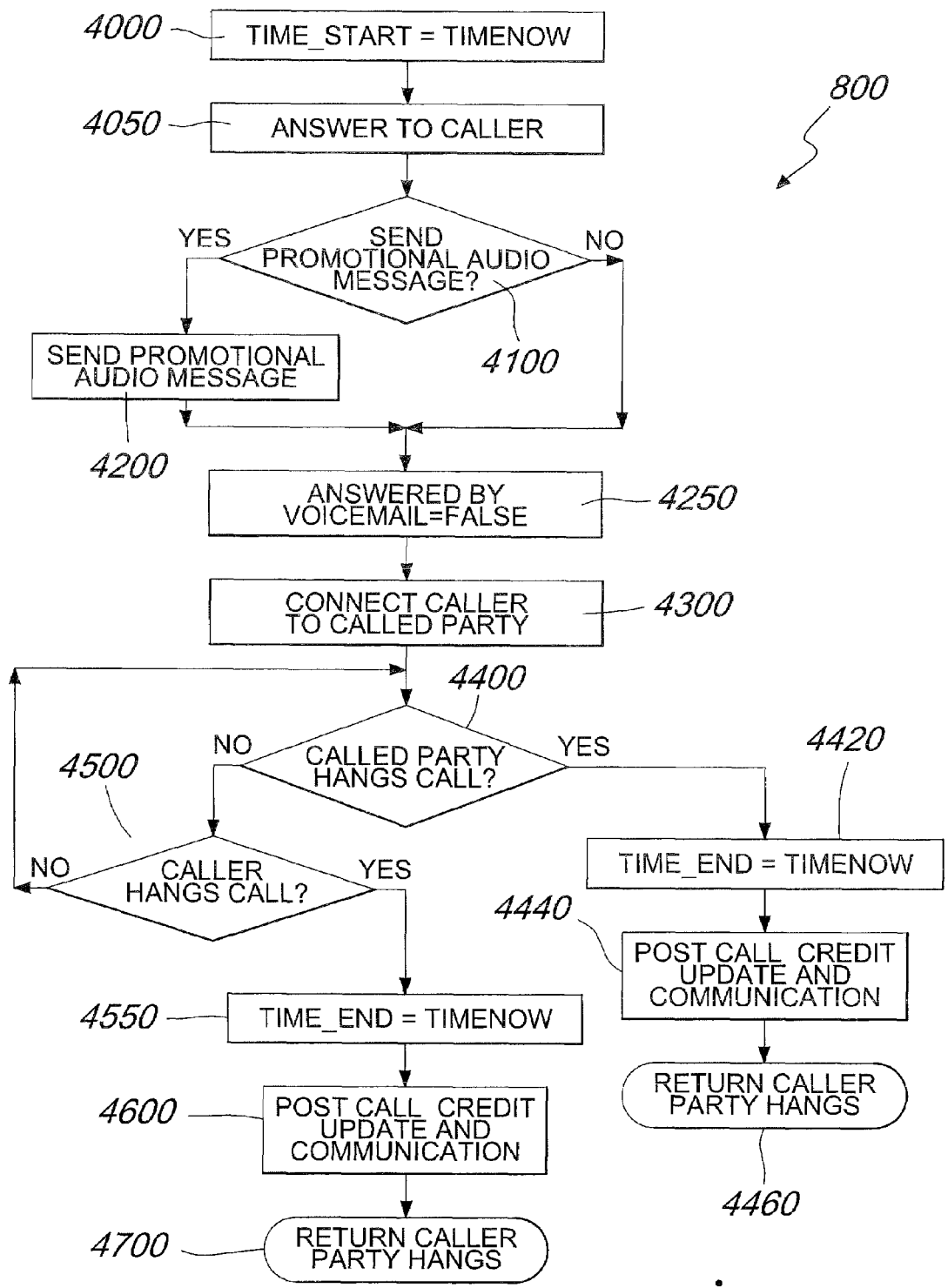
Figure 8:
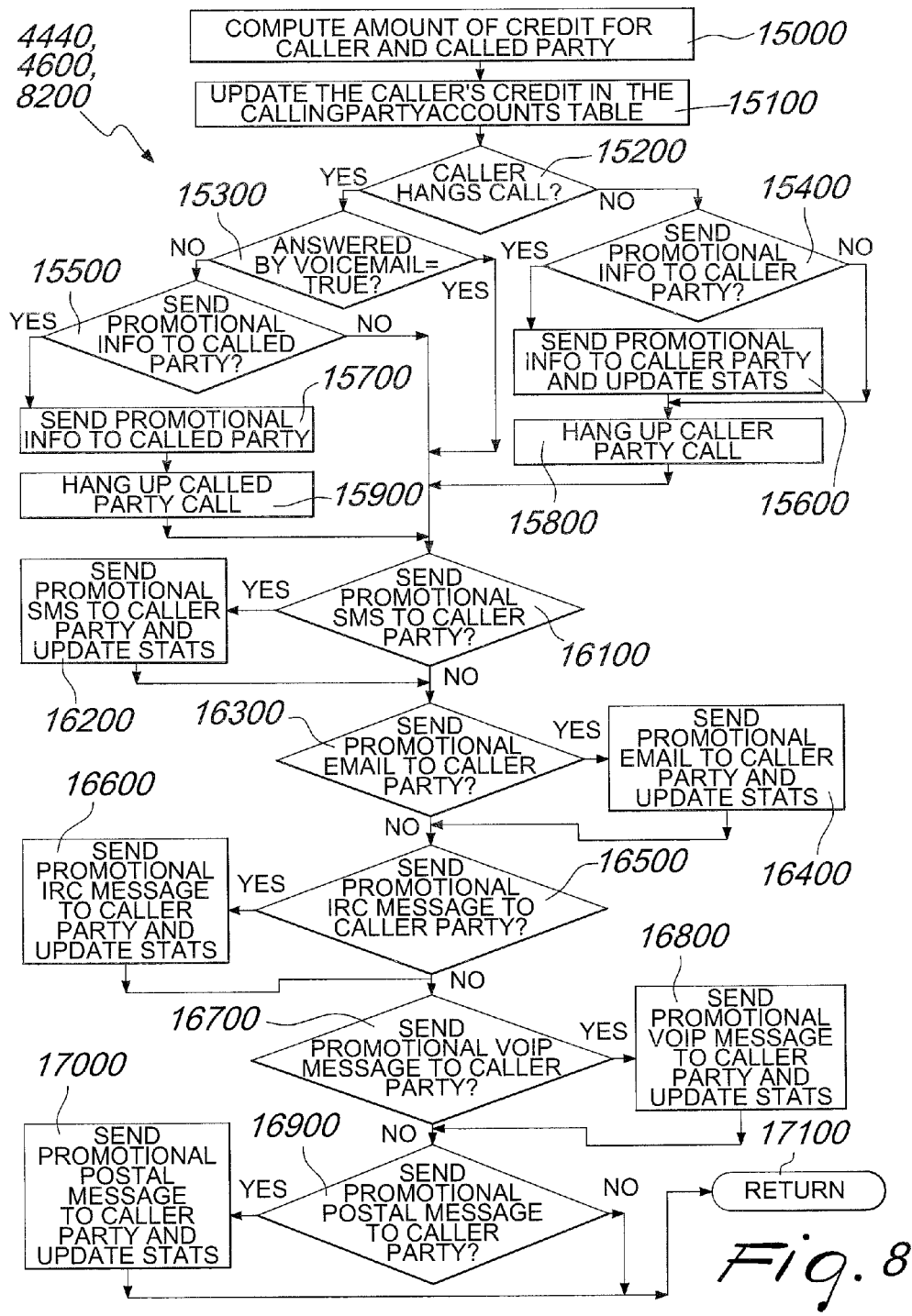

In the preferred but not exclusive embodiment of the invention, the system according to the invention further comprises means 14 for informing of the existence and/or balance of the virtual account, which are adapted to inform, by means of audio and/or spoken and/or visual messages, the user 4 or 6 originateing the call of the existence and/or balance of said virtual account CV (steps 4200, FIG. 6; steps 6200, 7600, 7650, FIG. 8; steps 15600, 16200, 16400, 16600, 16800, 17000, FIG. 8).

The expression "balance of the virtual account CV" is used to reference the amount of the credit contained in the virtual account CV.

Said means 14 for informing of the existence and/or balance of the virtual account can consist of AR3 routines, which in the case of a telephone call plays back audio information before establishing the call between the called party and the calling party, by way of non-limiting example, in the case of the SIP protocol in the "Early Media" step or, in the case of an ISDN ITU-T Q.931 protocol with complete selection prior to CONNECT, therefore even before the tariff charging of said call begins, or as soon as the call is established, or during the call, or at the end of the call, after the called party hangs up, before the calling party hangs up, or even at a later time.

If the user 6 who is the recipient of the conversation is not reachable but has voicemail service, the means 14 for informing of the existence and/or balance of the virtual account may include an AR7 routine which may communicate the information in an audio format in a particularly effective manner, since the messages might be inserted in the voice menus of the voicemail service, on which the operator has discretionary power.

Moreover, both for telephone calls and for any other type of communication, the means 14 for informing of the existence and/or balance of the virtual account which inform the originating user of the existence and/or balance of the virtual account CV can include a routine which communicates this information by sending an SMS AR11, an e-mail AR8, an instant message AR12, a traditional or VOIP telephone call AR9, a traditional postal written message AR10, mass communications such as promotional messages via television/radio/press, or person-to-person communications.

The addresses to which said communications are to be sent can be obtained by virtue of address search means 15 (FIG. 1), which consist of routines which query appropriately provided databases such as telephone directories, electronic directories such as DNS, ENUM, so as to find the address or addresses and optionally the identities of the actual owners/users and/or entities which pay the invoices related to the network identifiers originating communications IC.

All the routines mentioned above can be run on the equipment of the central unit 1.

The means 5 for assigning a subscriber network identifier IS might entail selection of the subscriber network identifier IS among new network identifiers or network identifiers which were previously assigned, for example by other operators.

In the second case, the procedure for transferring a subscriber network identifier IS from one operator to another is commonly known as Number Portability and the means to perform it are well-known to persons skilled in the art.

The means 14 for informing of the existence and/or balance of the virtual account which can be registered to a network identifier originating communications might be used in combination with means 17 for assigning an appropriate operator service network identifier IO dedicated to this purpose, fully similar to the means 5 already described above, and means 18 for identifying the network identifiers originating communications IC toward said appropriately provided operator service network identifier IO fully similar to the means 7 described above.

In other words, the system according to the invention includes assignment means 17, by way of which the operator sets up an appropriate operator service network identifier IO, such as for example a dedicated telephone number which, once called, provides automatically to the calling party information regarding the virtual account CV associated with the number of the calling party.

In a possible constructive variation, the system according to the invention further comprises means 19 for receiving instructions for debiting/crediting at least one virtual account CV. The system might also include means 20 for calculating according to preset criteria any commission to be applied to the beneficiary of the credit, means 21 for deducting this commission calculated by means 20 from the credit to be credited to the beneficiary, means 22 for calculating according to preset criteria any commission to be applied to the one imparting the crediting instructions, means 23 for checking availability on the virtual accounts CV to be debited of credit equal to or greater than the crediting to be debited, optionally with the addition of the commission calculated by the means 22, means 24 for drawing debits at least on said virtual accounts CV; means 25 for crediting said operator, other virtual accounts CV or third parties; and means 26 for notifying the beneficiary and/or to the person who gave the credit instructions on the outcome.

The system according to the invention therefore includes, in a variation, also the means for allowing entities to have at their disposal for example funds accumulated in the virtual accounts CV in order to make payments. At the same time, the invention includes the means to allow the operator to calculate and apply commissions to the parties who order the credit and/or benefit from the credits so as to be able be compensated for the service provided. Finally, the invention includes the means for checking the availability of sufficient credit to perform the required crediting.

Some of the means 19-25 cited above are already known and used by companies which provide financial services, such as banks, online banks, credit cards companies and electronic and/or online payment systems companies, however at least part of the credit used to enact the debiting is accumulated by way of the means described so far in virtual accounts CV created with the means described so far.

In particular, the means 19 for receiving debit/credit instructions include web sites, ATMs, automatic IVR telephone systems, call centers, physical sites with personnel assigned to receiving instructions from clients. In this specific case, means are included for indicating the network identifier originating communications/identifiers IC to which the virtual accounts CV from which credit is to be drawn refer to.

The means 20 and 22 for calculating the commission to be applied to the beneficiary of the credit and the commission to be applied to whoever imparts the credit are therefore among known ones and consist generally but not exclusively of routines which, on the basis of conditions agreed beforehand with the involved parties and on the basis of the amount of the credit and of any other variables, apply appropriate calculation algorithms.

The means 21 for deducting the commission applied to the beneficiary are fully similar to the ones used by companies which manage credit cards, and consist generally but not exclusively of routines which subtract the amount calculated by the means 20 from the amount to be credited to the beneficiary.

The means 23 for checking the availability of sufficient credit on the virtual account CV to perform the ordered credit are similar to those used by banks and companies which manage credit cards, and in this case consist of a routine which accesses the database DB-CV and which, for each network identifier originating communications IC, reads the amount of accumulated credit and compares said amount with the credit to be debited, either net or including the commissions to be applied.

The means 24 for debiting the virtual accounts CV consist of a routine which accesses the database DB-CV which stores the amount of accumulated credit that corresponds to each network identifier originating communications IC, reads said amount, reduces it by the amount equal to the debit to be made, and replaces in the database table the amount stored previously with the new amount calculated as described above.

The means 25 for crediting third parties are similar to the ones already used presently in financial transactions. For example, in the case of a funds transfer, the means can consist of a routine which, given the amount and the details of the accounts to be debited and credited, manages the communication with the information systems of one's own bank so as to make said funds transfer.

However, in the case the operator itself and/or other virtual accounts CV are to be credited, said means 25 for crediting third parties might be bypassed completely, since there is not necessarily a flow of credit between the systems of the operator and third-party systems.

Moreover, in case another virtual account CV is to be credited, the means 25 can consist of a routine which accesses the database DB-CV which stores, for each network identifier originating communications IC, the amount of accumulated credit, reads the amount related to the virtual account CV corresponding to the credit recipient, increments it by the amount of the credit to be made, and stores in the database DB-CV the amount previously stored with the new amount calculated as described above.

Finally, the means 26 for notifying the outcome to the beneficiary and/or to the issuer of the order include a routine which readies communications in written, visual, audio or video format and by the corresponding communications means, such as for example e-mail, Web, telephone call, instant message, SMS, traditional mail message, person-to-person communication.

In one embodiment, the system according to the invention also includes implementation means, generally but not exclusively provided by virtue of routines which implement already-known algorithms for transactional database management, so that the simultaneous occurrence of operations on a same account and in general on a same data item stored in a database may not thwart the aim of the means described so far.

All the routines mentioned above can be run on the equipment of the central unit 1.

The system according to the invention might also comprise, in a possible embodiment, verification means 27 for determining the "associable entities" with which a network identifier originating communications IC can be associated.

Moreover, the system according to the invention might also include means 28 for granting "associable entities" selective access to one or more virtual accounts CV for the purpose of imparting orders and/or retrieving account information, also on the basis of the information provided by the verification means 27, and means 29 for limiting access only to selectively authorized "associable entities" to one or more virtual accounts CV for imparting orders and/or retrieving account information In other words, for each virtual account CV the operator might have the need to limit the possibility to perform crediting operations only to some "associable entities", for example only to the entities that can be associated with the network identifier originating communications IC related to that particular virtual account CV.

It should be noted that the operator has the prerogative of choosing whether, and which of, these and other criteria are to be used to limit access to a given virtual account CV and to change over time whether, and which of, these criteria are to be used to grant access each virtual account CV, even according to preset sequences.

The term "entity" is used to reference a physical or juridical person.

The expression "associable entity" is used to reference the entity to which a network identifier originating communications IC is assigned and/or registered and/or which uses said identifier and/or which pays the corresponding invoices and/or has some form of entitlement to said network identifier originating communications IC.

The verification means 27 for establishing the "associable entities" associable with a network identifier originating communications IC can include means such as a fax, traditional mail, e-mail to receive a copy of at least one invoice or other third-party document which can be linked to the network identifier originating communications IC to which the virtual account CV is registered, and even manual verification means to ascertain that the invoice and/or document can actually be traced back to the specific network identifier originating communications IC.

The verification means 27 can also be automatic and can consist of entity searching means 30, similar to the address searching means 15, i.e., routines that trace the entities to which network identifiers originating communications IC have been assigned by querying appropriately provided databases such as for example telephone directories, electronic directories such as DNS, ENUM, etc.

The means 28 for selectively authorizing entities to access one or more virtual accounts CV for imparting orders and/or for obtaining account information are fully similar to the ones currently used to authorize this type bank account access, and consist generally but not exclusively of procedures and means of communication for establishing and/or exchanging beforehand credentials such as IDs, passwords, PINs, cards/keys, or for the preliminary acquisition of biometric data, subsequently requested by access limiting means 29.

In the preferred embodiment, for a given virtual account CV, the authorizing means 28 are applied in order to authorize only those entities that the verification means 27 have established as "associable entities" associated with the network identifier originating communications IC to which said virtual account CV corresponds.

The means 29 for limiting access to authorized entities for imparting orders and/or obtaining information to/from one or more virtual accounts CV are already known and consist generally but not exclusively of the same means currently used to limit access to online banking means and ATMs. They are generally but not exclusively based on routines which require and/or check credentials such as IDs, passwords, PINs, cookies, cards/keys, biometric data or data based on physical checks.

In the case of access requests received by electronic means, it is possible to simplify the checking procedure and simultaneously increase its security by way of means 16 for acquiring the requesting network identifier originating communications IC fully similar to the monitoring means 7 and therefore can be loaded as a specific routine on central unit 1. In this manner, the originator of the call does not have to enter his network identifier manually. Moreover, for greater security, means can be included for verifying the match between the network identifiers originating communications IC for ordering the crediting operations and the network identifiers originating communications IC to which the virtual accounts CV subjected to orders correspond.

The use of the verification means 27 might be limited only to the first debit request for a given virtual account CV, since once it has been established that a given entity can be associated with one or more network identifiers originating communications IC, the operator can provide said entity with selective authorization for imparting orders and/or obtaining account information to/from the virtual account or accounts CV that correspond to the network identifier originating communications/identifiers IC (by virtue of the authorization means 28), and from then onward the entity can surpass the access limitation procedures implemented by the access limitation means 29.

The verification means 27 can be used proactively to identify beforehand "associable entities" which can be associated with network addresses originating communications IC, and therefore the authorizing means 28 can be used proactively to exchange the corresponding credentials with said entities even before they contact the operator and/or to report to said entities the existence and/or balance of the virtual accounts CV respectively associable with said entities by virtue of communications toward addresses of any kind, for example post, e-mail, IM, which can be reasonably traced to said entities, which in turn are obtained by virtue of the already described address searching means 15, or by sending a message to terminals 3 for each of which a third party certifies who is the associable entity (for example SMS to mobile telephone).

Moreover, the system according to the invention can comprise interchangeability means 31 in order to allow the interchangeability, within the central unit, of all the equivalent network identifiers originating communications IC and subscriber network identifiers IS.

For the purpose of the description of the means 31, the expression "equivalent" network identifiers references the various representations of a same network identifier originating communications IC and/or subscriber network identifier IS. For example, a telephone number can be represented with or without the prefix part, such as the country code and/or area code, but the various representations are equivalent to the same number. It is understood that the various variations of a network identifier originating communications IC which include fields left at the discretion of the registrant are also equivalent. For example, a company with several telephone extensions might be the registrant of the telephone number +39 02 4381 9xy, where x and y are numeric fields left at its discretion. The various network identifiers related to the various extensions can be associated with the corresponding root and are therefore equivalent in terms of this definition.

The expression "equivalent network identifiers" is understood to also designate network identifiers originating communications IC and/or subscriber network identifiers IS which are completely different from each other but can be associated (according to the definition already given of "associable entity") with a same entity because they are assigned to it. For example, a same company might be the registrant of a telephone number and of a fax number which are completely different.

In other words, the operator might have an interest, when possible, to consider as a one the network identifiers originating communications IC and/or subscriber network identifiers IS which are equivalent and/or associable with a same entity, because in this case the operator might for example create and manage a single virtual account CV instead of several accounts.

The interchangeability means 31 can include: a routine 32 for normalizing network identifiers, always including all the prefix parts, always using the same format, such as for example the international format of telephone numbers; a routine 33 for selecting the network identifiers originating communications IC and/or the network identifiers contacted successfully by the operator's own users 6 or valid identifiers obtained from other sources of valid identifiers (for example telephone directories) and storing them in an appropriately provided database DB-N (which can be implemented for example on the central unit 1), with the information regarding the registrant, if available; a routine for populating the database DB-N with valid network identifiers; a routine 34 for associating and updating an expiration time with each network identifier is present in DB-N, and for implementing deletion of records that exceeded said expiration time; routines for deleting from the database DB-N the network identifiers after a certain period of time has elapsed since the last time when calls originated from said identifier or terminated successfully toward said identifier were recorded; a routine 35 for establishing whether a network identifier originating communications IC which is already known in the database DB-N populated and updated with the routines 33 and 34 is a subpart of a longer network identifier originating communications IC (for example, in the case of telephone numbers, to recognize that +390243819 is a subpart of +390243819338 and therefore the latter is traceable back to the former); a routine for recognizing whether a network identifier is traceable back to a root which is present in the database DB-N of valid numbers and is therefore equivalent to associable with the root; routines 36 which correlate the network identifiers originating communications IC associable with the same entities by using the data read and/or stored above and/or on the basis of data correlating network identifiers originating communications IC to entities, obtained by means of the entity searching means 30 and routines which query telephone directories, DNS and ENUM databases in order to establish whether two or more network identifiers are traceable back to the same entity.

Finally, it should be noted that if a communication originates from a network identifier originating communications IC of a subscriber of the operator toward a subscriber network identifier IS of the operator, the network identifier originating communications IC is in turn a subscriber network identifier IS and the two are fully equivalent to each other.

The invention further comprises a method for managing telecommunication services provided by an operator to telecommunication service users 4, 6 by means of a management system described above, which includes steps for: assigning to each subscribed user 6 a subscriber Network Identifier IS by way of the assignment means 5; monitoring inbound calls toward said subscriber network identifiers IS of subscribed users 6 by way of the monitoring means 7; creating, by way of virtual account creation and management means 8, a virtual account CV which is registered to a network identifier originating communications IC. Provisions are also made for informing, by way of information means 14, at least the telecommunication service user 6 that originates the communication toward the subscriber network identifier IS and/or the registrant of the network identifier originating communications IC of the existence and/or balance of the virtual account CV.

The step for assigning a subscriber network identifier IS can comprise the assignment to the subscribed user 6 of a single subscriber network identifier IS, such as a single telephone number, which allows termination of inbound calls toward one among a plurality of telecommunication terminals 3a-3f, such as fixed telephones, mobile telephones, VOIP terminals and/or accounts, voicemail services.

In addition, the method can comprise steps for selecting, by way of the means 12 for selective termination of inbound calls, telecommunication terminals 3a-3f for termination of inbound communications according to a preset algorithm AR0; selecting, by way of the means 12 for selective termination of the inbound communications, among said telecommunication terminals 3a-3f selected in the preceding step only the telecommunication terminals 3 on which the subscribed user 6 can be reached by the inbound call, and terminating said inbound communication on a preferred telecommunication terminal 3 among the ones selected in the preceding step.

The step for selecting the inbound communication termination terminals 3 according to a preset algorithm can include a step for establishing a priority sequence according to termination costs.

The method can comprise calculating, by virtue of tariff calculation means 13, a difference between what is/can be invoiced by the operator for a communication received from a network identifier originating communications IC and the cost to the operator for terminating said communication. This calculation step can be followed by the step for crediting to the virtual account CV registered to said network identifier originating communications IC funds which correspond to all or part of the difference calculated in the preceding step, a fixed value assigned by the operator for each minute of conversation occurring as a consequence of the inbound communication, a fixed value which is established arbitrarily by the operator regardless of whether a conversation occurs or not.

In the scope of the method according to the invention, it is also possible to perform steps for informing at least the user 4 or 6 who originates the communication having a given network identifier originating communications IC, by way of the information means 14, of the amount of credit which is the result of the funds credited to the virtual account CV registered to said network identifier originating communications IC and also to assign, by way of the assignment means 5, to a new subscribed user 6 a new subscriber network identifier IS.

Therefore, a subscribed user 4 of another operator, which might be associable with a network identifier originating communications IC to which a virtual account CV is registered, might obtain from the operator a subscriber network identifier IS, for example a telephone number, and become a subscriber 6 of the operator.

Other steps can also be provided to allow the subscribed user 6 to which the subscriber network identifier IS has been assigned to report to the operator a list of his telecommunication terminals 3 where he can be reached by means of a single subscriber network identifier IS assigned to him, and to associate said telecommunication terminals 3 to the single subscriber network identifier IS of the user. Said steps for list reporting and association of a single identifier can be performed before the monitoring step begins.

In other words, as part of the supply to the subscriber 6 of a Follow Me Unique Number service for being reached on a plurality of terminals 3, the subscriber 6 can report to the operator the list of the terminals 3 that must be linked to the Unique Number. It should be noted that this communication might occur before the supply of the Follow Me Unique Number service begins, but also after, so as to be able to add/remove terminals 3.

In a specific step it is possible to select the subscriber network identifier IS to be assigned, among previously unassigned network identifiers and previously assigned network identifiers.

For example, new subscribers of the operator might "carry" telephone numbers which have already been assigned to them by other operators onto the network of the operator as in the already-known Number Portability procedure.

Other steps of the method can comprise the assignment of an appropriate operator service network identifier IO and the reporting to a user 4, 6 of telecommunication services which originates a communication toward said appropriately provided operator service network identifier IO of the existence and/or balance of the virtual account CV registered to the network identifier originating communications IC.

It is also possible to have steps such as receiving orders for debiting-crediting said virtual account CV imparted by entities associable with said virtual account CV, establishing with which of the entities cited above the cited network identifier originating communications IC is actually associable, and rendering interchangeable, within the central unit of the telecommunication services management system, all the network identifiers originating communications IC and the subscriber network identifiers IS which are equivalent.

All said steps can be managed flexibly and repeated if necessary for the application of the new method described here, since they can be performed in a cyclic manner.

One might thus create a virtuous circle, by mens of which, starting from a limited number of subscribed users 6, said subscribers 6 are called by their callers, which initially would be to a large extent subscribers 4 of other operators, virtual accounts CV are created which are registered to the network identifiers (telephone numbers) assigned to the correspondents 4 of the operator's own subscribers 6. Said virtual accounts CV are supplied with part of the difference between the cost and the revenues that the operator incurs in terminating the calls toward its own users 6. The calling users 4, 6 are notified of the existence of the virtual account CV and therefore they come into contact with the operator and in turn become subscribers 6, in turn obtaining a telephone number from the operator and in turn being called by their correspondents, and so forth.

This solution is advantageously defined, within the scope of the invention, as a new method for constituting a progressively incremental variable group of users 6 of telecommunication services provided by an operator by assigning subscriber network identifiers IS.

In a preferred but not exclusive embodiment, this method comprises steps for acquiring an initial number of subscribed users 6; assigning to each subscribed user 6 of said initial group of subscribed users respective subscriber network identifiers IS; notifying the subscriber network identifiers IS to current and potential users 4, 6; monitoring inbound calls toward said subscriber network identifiers IS in order to identify inbound network identifiers originating communications IC; creating, following a communication originated from a said network identifier originating communications IC toward at least one of the assigned subscriber network identifiers IS, a virtual account CV which is registered to said network identifier originating communications IC; and informing said users 4, 6 of telecommunication services of the existence and/or balance of the virtual account CV registered to the network identifier originating communications IC.

This method with management optimization goals, both in terms of the equipment required and used for an ever-increasing number of users 6 and in economic terms, is based practically on the same components of the system and steps similar to the ones mentioned above in relation to the telecommunication services management system and method.

Accordingly, it also comprises informing of the existence and/or balance of the virtual account CV registered to the network identifier originating communications IC at least the user 4, 6 of telecommunication services which is the registrant of said network identifier originating communications IC.

The step for assigning subscriber network identifiers IS might comprise the assignment to the subscriber 6 of a single subscriber network identifier IS which allows the termination of calls toward it on any of a plurality of telecommunication terminals 3.

Moreover, steps are also provided for selecting, by way of the means 12 for selective termination of inbound communications, the terminals 3 on which the inbound communication is to be terminated according to a preset algorithm AR0; selecting, by way of the means 12 for selective termination of inbound communications, among said terminals 3 selected in the preceding step, only the telecommunication terminals 3 on which the subscriber 6 can receive the inbound communications; and terminating said inbound communication on a telecommunication terminal 3 among the ones selected in the preceding step.

As in the management method described above, the preset algorithm AR0 might be set to perform operations in order to minimize termination costs by establishing a sequence of priorities on the basis of termination costs.

The present method for creating the progressively incremental group of users can also include one or more of the steps for calculating, by way of tariff calculation means 13, a difference between what can be and/or is invoiced for a communication by the operator and the cost to the operator for terminating said inbound communication; crediting on said virtual account CV funds which correspond to all or part of the difference calculated in said calculation step, a fixed value assigned by the operator for each minute of conversation occurring as a consequence of the inbound communication, and a fixed value which is established arbitrarily by the operator regardless of whether a communication occurs or not; informing the user who originates the communication, by way of said information means 14, of the amount of the credit resulting from the funds credited on the virtual account CV; and steps for incrementing the number of subscribed users 6 who are users 4, 6 of the telecommunication services with subscriber network identifiers IS by affiliation to the group of subscribed users 6 of new users, to which new subscriber network identifiers IS are assigned according to a new step for assigning a subscriber network identifier IS; subsequently continuing with a new step for notifying the newly assigned subscriber network identifiers IS to current and potential users 4, 6.

As in the case of the previously described management method, the described steps can be repeated cyclically every time an inbound communication from a network identifier originating communications IC occurs toward one of the subscribed users 6 which has a registered subscriber network identifier IS.

In the present method it is also possible to associate steps for reporting to the operator, on the part of the subscribed user 6 who has been assigned a single subscriber network identifier IS, a list of the telecommunication terminals 3 on which he will be reachable by means of said single subscriber network identifier IS, and steps for associating said telecommunication terminals 3 with the single subscriber network identifier IS, which can be performed before starting each step for notifying the subscriber network identifiers IS to potential users 4, 6.

The step for creating the virtual account CV can comprise the creation of a virtual account CV which is registered to a potential user 4 outside the group of subscribed users 6 even before said potential user originates a communication toward a subscriber network identifier IS.

A variation is thus provided in this method also, according to which a virtual account CV is created even before the potential user 4, 6 originates a communication toward a subscriber network identifier IS, for example only on the basis of the knowledge of the existence of a network identifier managed by another operator.

Moreover, it is possible to provide for the creation of virtual accounts CV which are registered to subscriber network identifiers IS of the same operator.

This is particularly useful in a step in which the operator has acquired a good market share and therefore a substantial percentage of the communications toward its own subscribed users 6 originate from other subscribed users 6 of said operator. In this case, it is nonetheless important to credit the operator's own subscribed calling users 6 with part of the difference between costs and revenue for terminating communications, in order to prevent one's own subscribed users 6 from switching to any other operator that might implement the method described here. In this case, after the step for creating the virtual account CV, the subsequent already-described steps are performed, from the step for informing users of the existence/balance of the virtual account CV to the step for terminating the inbound communication on a selected terminal 3, followed by a new step for applying a discount to the bill of the subscribed user 6 which originates a communication for a value lower than, or equal to, the funds credited on the virtual account CV of the subscribed user 6.

The present method might also comprise, in a more complete version thereof, steps for the assignment of an appropriately provided operator service network identifier IO and for reporting to a user 4, 6 of telecommunication services who originates a communication toward said appropriately provided operator service network identifier IO the existence and/or balance of the virtual account CV registered to the network identifier originating communications IC.

Finally, other steps of the method can be provided advantageously to: receive instructions for debiting/crediting from said virtual account CV on the part of entities which can be associated with said virtual account CV; to establish which of said entities said network identifier originating communications IC is actually associable with; and to render interchangeable, within the central unit of the telecommunication service management system, all the network identifiers originating communications IC and/or equivalent subscriber network identifiers IS.

Examples of Practical Embodiment of the Invention

In possible practical implementations of the invention, the Entities to which the "Virtual Accounts" CV are assigned can use the credit when they establish a direct relation with the Operator (they subscribe). They can become aware of the existence of the "Virtual Account" CV by means of a message inserted before/at the beginning of/during/after the conversation with the subscriber 6 of the Operator, or by means of a message which is sent in case of busy, or by means of a communication or a message originated by the Operator at a time subsequent to the conversation, or by SMS, e-mail or by messaging/advertising on any medium which can reach the Entity to which the "Virtual Account" CV is registered.

The Credit can be used for any purpose, but one of these purposes might be to allow the credit to be usable for the purchase of specific services provided by the Operator.

Another form of practical application of the described invention entails that the crediting on the virtual account CV associated with the network identifier originating communications IC of another operator is performed not only if the cost for terminating the communication to one of the operator's own subscribers 6 has been lower than the funds collected from the operator of the calling party (directly or indirectly), but in a fully arbitrary manner, in order to acquire new subscribers who are interested in using a cheaper service. For example, Operator A might launch a campaign to acquire users of an Operator B: when a subscriber of Operator B calls a user of Operator A, Operator A creates a virtual account CV registered to the subscriber of Operator B and reports this, as described above, before/at the beginning of/during/after the conversation with the subscriber of Operator B, or by means of a message which is sent if busy, or by means of a communication or message originated by the Operator at a time which is subsequent to the conversation, or by means of an SMS, e-mail or by messaging/advertising on any medium which can reach the Entity to which the "Virtual Account" CV is registered.

Therefore, in a different form of application, the virtual account CV is created and credited without the subscriber of Operator B calling a subscriber of Operator A.

In a further different form of application of the described invention, "Virtual Accounts" CV are created also for subscribed users 6 who belong to the same operator and already have a contractual relation with said Operator.

In yet another different form of application, the existence of a virtual account CV might be reported at the end of a communication from a subscribed user 6 of Operator A to a subscriber 4 of Operator B.

In all the cases described above, it is also possible to use algorithms (for example, see steps 4100, 6100, 7630, 15400, 16100, 16300, 16500, 16700, 16900) to minimize annoyance caused by communications of the existence of the virtual account CV, which are described below.

In the specific example of practical embodiment of the invention described here, which is merely a non-limiting example:
- the inbound and outbound communications between terminals 3 of users of telecommunication services consist of telephone calls;
- the subscriber network identifiers IS and the network identifiers originating communications IC are telephone numbers;
- the credit managed by the Virtual Accounts CV consists of monetary funds;
- the operator offers to its subscribers 6 the Follow Me Unique Number service, by means of which a single telephone number allows the termination of every inbound communication routed thereto toward one among a plurality of terminals 3 of the subscriber 6, furthermore giving priority to the terminals 3 having lower call termination costs and, for equal costs, depending on the preference expressed beforehand by the subscriber 6;
- the terminals 3 of the recipients of the phone calls may be fixed telephones, mobile/cellular telephones, fixed telephones with VOIP, Internet terminals with VOIP, mobile/cellular telephones with VOIP;
- a subscribed user 6 may be the registrant of a plurality of subscriber network identifiers IS, but only one set of terminals 3, which he reports to the operator, can correspond thereto;
- only cases in which the call toward the operator's own subscriber 6 originates from another operator are considered, and it is assumed that third-party operators pay to the operator a termination tariff as compensation for the termination of calls on its network (termination regime, not origination regime);
- it is assumed that all third-party operators pay the same termination tariff to the operator for each given subscriber number;
- if the cost for terminating a call is higher than the termination tariff, the call is terminated only if the called party accepts to cover at least the difference;
- the virtual account CV associated with a network identifier originating communications IC is supplied by virtue of part of the difference between the operator's revenue for inbound calls from said identifier and the cost for terminating said calls;
- part of the difference between the costs and revenues of the telephone calls toward a given subscribed user 6 is reserved for said user, and the subscribed user 6 receives from the operator information in this regard;
- the existence/balance of the virtual account CV is reported to the user 4, 6 who originates the call by means of audio messages before, during or after the call, or by means of messages sent by virtue of other means after the telephone call;
- the operator provides the subscriber 6 voicemail service, and this service is configured appropriately so as to report to the calling party the existence/balance of the virtual account CV associated with the number of the calling party;
- algorithms are implemented for limiting the annoyance caused to said calling party according to preset rules.

The implementations of the mechanisms for:
- creating and managing an appropriate operator service network identifier IO with which users 4, 6 can establish communications in order to receive information regarding the existence and/or balance of the virtual account CV assigned to a network identifier originating communications IC;
- informing the calling parties 4, 6 of the existence and/or balance of the virtual account CV during call setup before the tariff charging of said call begins (for example in the "Early Media" step related to the SIP protocol, or in the case of the ISDN ITU-T Q.931 protocol after selection is complete and before the CONNECT);
- deducting from the virtual accounts CV any funds to cover the negative difference between the revenues and the costs of calls terminated by the operator;
- managing the third-party payment system and the corresponding systems for receiving debiting and crediting orders, calculating and applying the commissions to the paying party and to the paid party, checking the availability of sufficient funds, and reporting the outcome of the operation;
- checking which entities are entities which are associable with the network identifiers originating communications IC to which virtual accounts CV are registered, and optionally authorizing them to access for orders said virtual accounts CV;
- rendering interchangeable the values of network identifiers originating communications IC which are equivalent or associable with a same entity;
- giving an incentive to entities associable with network identifiers originating communications IC with which virtual accounts CV are associated and that do not already have direct relations with the operator to become subscribers 6 of the operator, also by virtue of conditional access to the credit;

shall be as described in sufficient detail so that the person skilled in the art to whom all the technical means currently in use are known can implement them as described in the preceding description.

Figure 3:
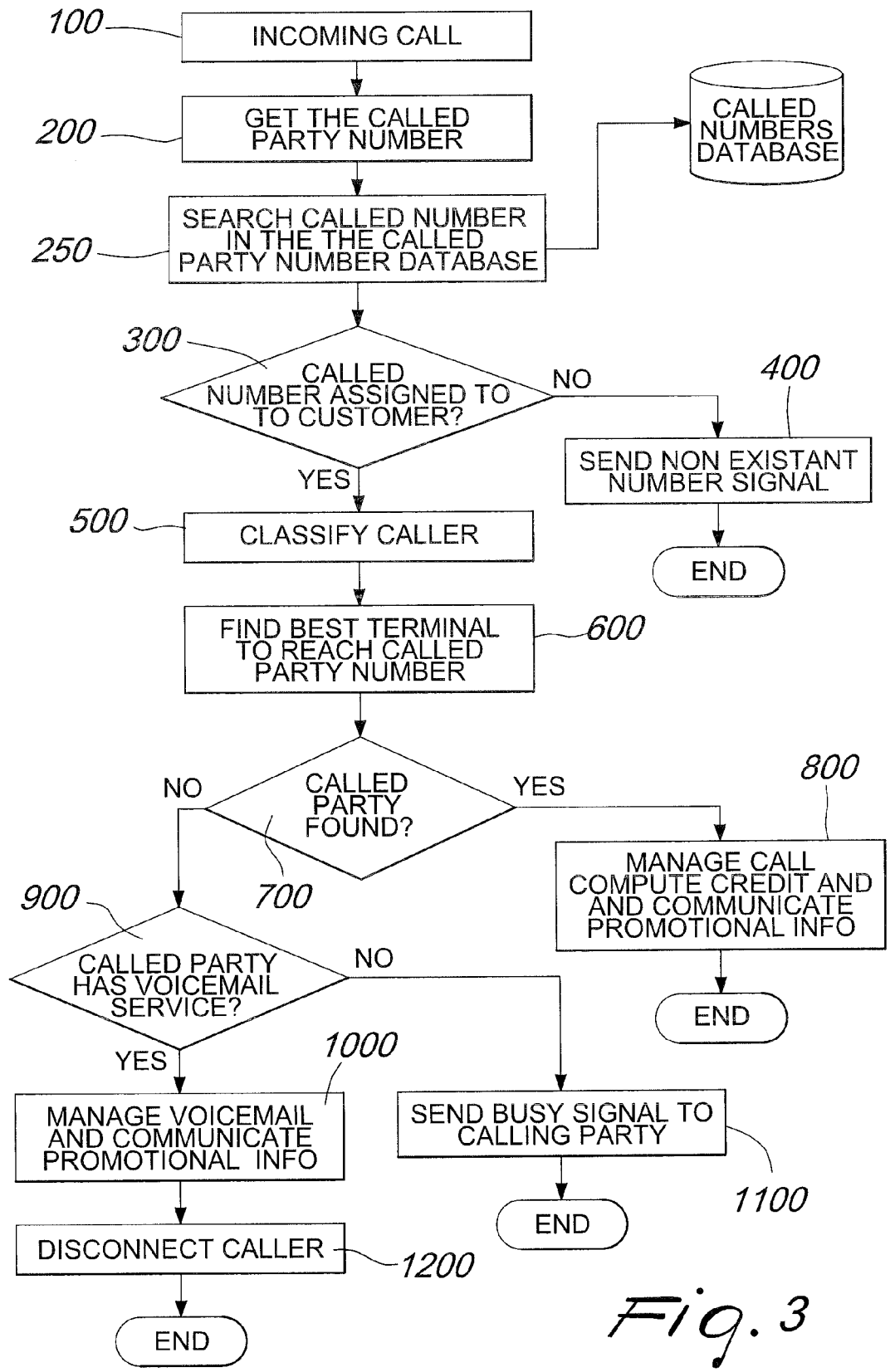
FIG. 3 is a block diagram of main steps for performing the method according to the invention, with routines which can be run on the system of FIG. 1.

FIG. 3 illustrates the main steps for performing the method according to the invention, which include routines which can be run on the equipment of the central unit 1 to manage the inbound calls toward the telephone numbers assigned to the subscribed users 6 of the operator. In step 100, it is assumed that an inbound telephone call arrives. In step 200, the called telephone number, hereinafter termed called party, is identified. Once the called party has been recognized, in step 250 a search is run for said called party within the "CALLED NUMBERS DATABASE", which is represented graphically in the Annexes at the end of the description, and more precisely a SELECT is made on the "CALLED_NUMBERS" table, with the following clause where CALLED_NUMBERS.CalledNumber=called party. At this point, step 300 checks whether the called party is associated with a user 6. If the called number has not been assigned to any user, the method proceeds with step 400, by means of which a signal indicating a non-existent number is sent to the party who generated the call, hereinafter referenced as calling party, and in this case the algorithm ends.

Figure 4:
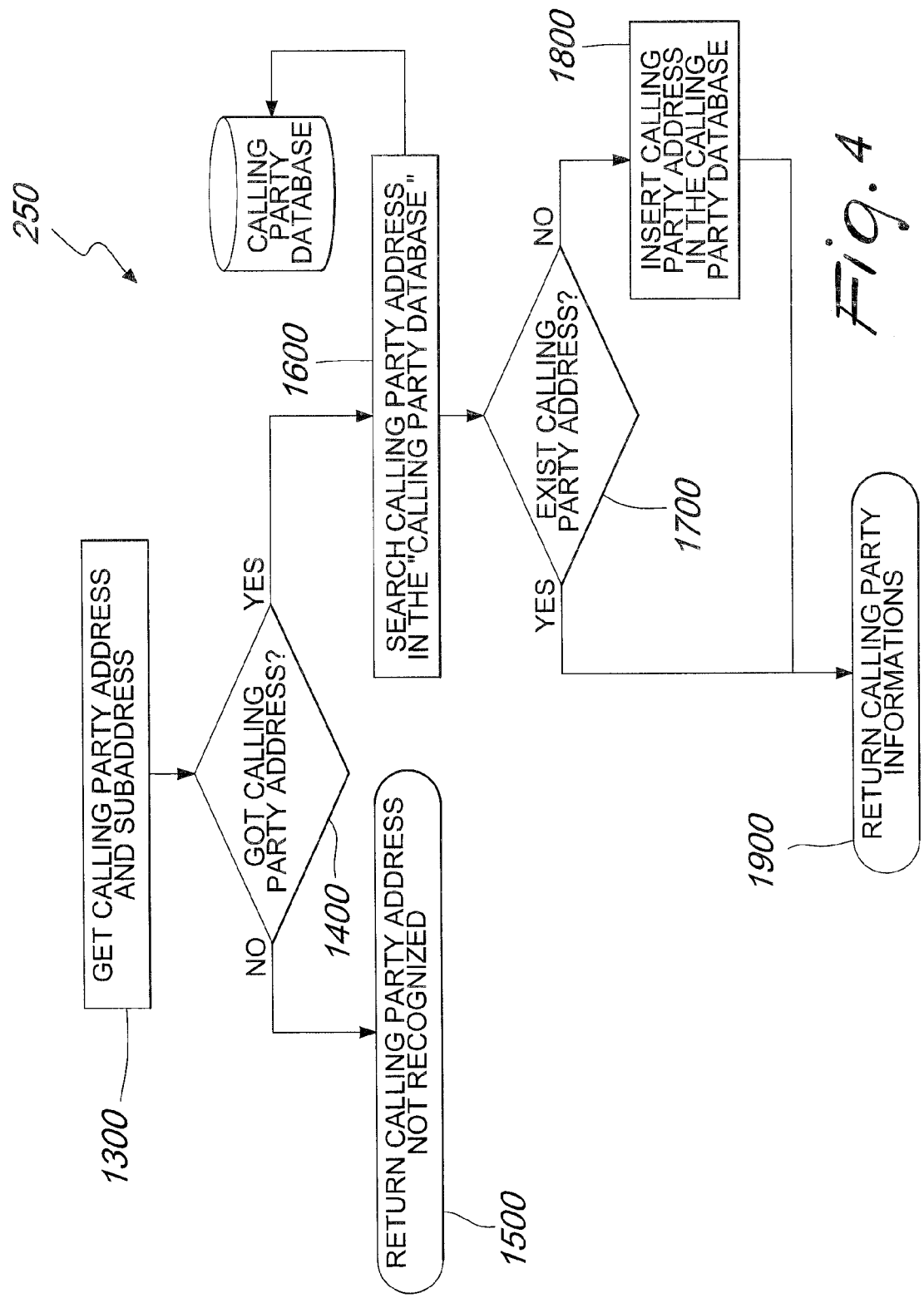
FIGS. 4 to 8 are more detailed diagrams of routines which can be run in the steps shown in FIG. 3.

If step 300 has verified that the called number is assigned to a user, the method proceeds with step 500, in which the number of the calling party is classified by means of the "CLASSIFY CALLER" procedure, shown in FIG. 4. Once the number of the caller has been classified, the method proceeds to step 600, where the procedure "FIND BEST TERMINAL TO REACH CALLED PARTY NUMBER", FIG. 5, checks the best device on which the called party can be contacted.

The method then moves on to step 700, which checks whether it has been possible to contact the called party by means of the procedure executed in step 600. If the called party can be reached, then step 800 executes the procedure "MANAGE CALL COMPUTE CREDIT AND COMMUNICATE PROMOTIONAL INFO" FIG. 6, by means of which the call is managed. Once the procedure executed in step 800 has been exited, the algorithm ends. If, in step 700, the called party is not reachable, the method proceeds with step 900, which checks whether the called party has a voicemail service. If the called party does not have a voicemail service, the method proceeds with step 1100, which sends a busy signal to the calling party. Once the busy signal has been generated, the algorithm ends. If step 900 has verified that the called party has a voicemail service, step 1000 executes the procedure "MANAGE VOICEMAIL AND COMMUNICATE PROMOTIONAL INFO", FIG. 7, by means of which the voicemail service is managed.

At the end of the procedure performed in step 1000, the method proceeds to step 1200, by means of which the caller is disconnected from the network. At this point the algorithm ends.

FIG. 4 illustrates the operation of the "CLASSIFY CALLER" procedure. As a first operation, in step 1300 the telephone number of the caller is requested to read from the network (i.e., the connection means 2). At this point, step 1400 checks whether the telephone number of the caller is obtainable. If this data item is not obtainable, the method proceeds with step 1500, by means of which the value of "CALLING PARTY ADDRESS NOT RECOGNIZED" is returned to the main routine. If step 1400 has verified that the telephone number of the caller is obtainable, the method proceeds with step 1600, which searches for the existence of the data related to the caller within the "CALLING PARTY" database, which is represented graphically in the annexes at the end of the description.

The operation is performed by means of a SELECT on the "CALLINGPARTYDATA" table, with the following where clause, CALLINGPARTYDATA.CallerId=caller.

The method moves on to step 1700, which checks whether the number of the caller has been found within the "CALLINGPARTYDATA" table. If the number of the caller has not been found, the method moves on to step 1800, by means of which the telephone number of the calling party is inserted within the "CALLING PARTY" database. The operation consists in entering the data related to the caller in the CALLINGPARTYDATA table, and in opening a new "virtual account" CV within the CALLINGPARTYACCOUNTS table, which stores the credit associated with each calling number. At the end of this operation, the method moves on to step 1900, by means of which the data related to the calling number and the values related to its "virtual account" CV are returned to the main routine. If, in step 1700, the availability of the calling number has been verified, the method proceeds with step 1900, which returns to the main routine the data related to the calling number together with the values of the associated "virtual account" CV.

Figure 5:
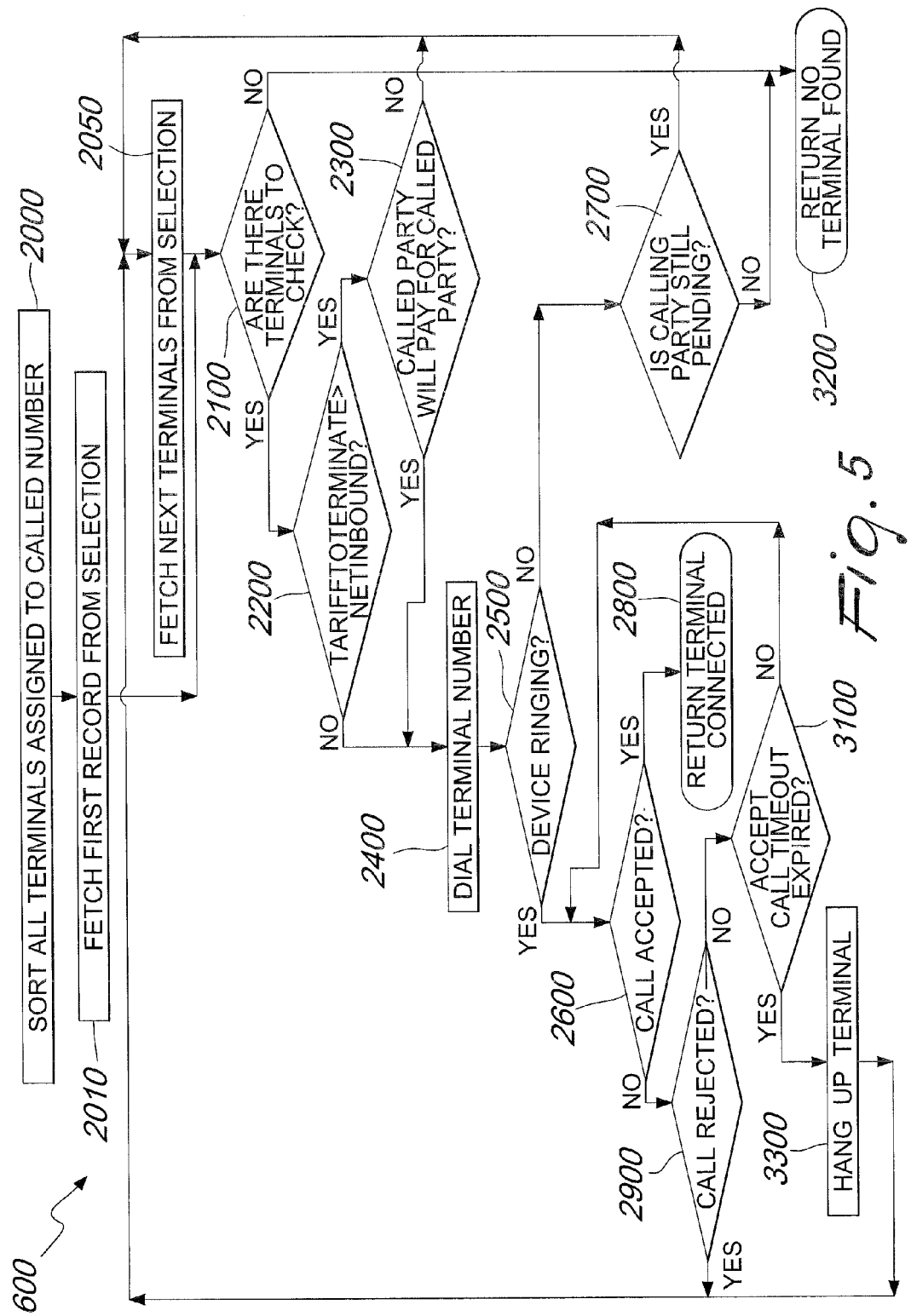

FIG. 5 illustrates the operation of the "FIND BEST TERMINAL TO REACH CALLING PARTY NUMBER" procedure 600. Step 2000 selects from the "CUSTOMERTERMINALS" table the terminals associated with the called party (which the called party indicated beforehand) and orders them according to the fields Available, then TariffToTerminate in ascending order and then UserPreference in descending order. In step 2010, the first terminal of the selection made in step 2000 is "pointed" to. Step 2100 checks whether the terminal "pointed" to in the list generated in step 2000 exists. If it does not exist, the method moves on to step 3200, which exits from the procedure returning the value of "NO TERMINAL FOUND" to the main routine. If in step 2100 the terminal exists, the method proceeds with step 2200, which checks whether the cost to contact the terminal (TariffToTerminate field of the "CUSTOMERTERMINALS" table) is higher than the value granted to the operator for terminating the call on his own network (NetInbound field of the "CALLEDNUMBERS" table, obtained in step 250). If the cost for contacting the terminal is higher than the value granted to the operator, the method moves on to step 2300, which checks whether the called party is willing to pay for the call. If the called party is not willing to pay for the call, the method moves on to step 2050, which "points" to the next terminal in the selection made in step 2000, and the method proceeds with step 2100, already described earlier, which checks whether said terminal exists. If step 2300 has verified that the called party is willing to pay for the call, or if in step 2200 the cost to contact the terminal is lower than the value granted to the operator for terminating the call on his own network, the method proceeds with step 2400, which calls the terminal. The method then proceeds with step 2500, which checks whether the called terminal is ringing. If the terminal is not ringing, the method proceeds with step 2700, which checks whether the calling party is still on the line. If the calling party is no longer on the line, the method proceeds with step 3200 (already described earlier). If step 2700 has verified that the calling party is still on the line, the method then returns to step 2050 (already described earlier).

If step 2500 has verified that the terminal is ringing, the method proceeds with step 2600, which checks whether the called party has accepted the call. If the called party accepts the call, the method proceeds with step 2800, which returns the "TERMINAL CONNECTED" value to the main routine. If step 2600 has verified that the called party has not yet accepted the call, the method proceeds with step 2900, which checks whether the called party has refused the call. If the called party refuses the call, the method returns to step 2050 (already described earlier) to check whether there are other terminals to be contacted. If step 2900 has verified that the called party has not refused the call, the method proceeds with step 3100, which checks whether the timeout associated with the time for accepting the call by the called party on a given terminal has expired. If the timeout has expired, the method proceeds with step 3300, which drops the call toward the terminal and then returns to step 2050 (already described earlier). If step 3100 has verified that the timeout associated with the call acceptance time has not expired, the method returns to step 2600 (already described earlier).

FIG. 6 illustrates the operation of the procedure "MANAGE CALL COMPUTE CREDIT AND COMMUNICATE PROMOTIONAL INFO" 800. In step 4000, the variable TIME_START is set to the current time. In step 4050, the system answers the call. Step 4100 checks whether, on the basis of a processing of the data which indicate the settings of the caller (data already obtained by lookup in the "CALL-INGPARTYDATA" table by using as key the CallerID field, within the "CLASSIFY CALLER" procedure), a promotional audio message has to be played. If a promotional audio message has to be played, the method moves on to step 4200, by means of which the system plays the message. Here, both when step 4100 has verified that a promotional message must not be played and when arriving from step 4200, the method proceeds to step 4250, by means of which the variable ANSWERED BY VOICEMAIL is set to FALSE.

Figure 7A:
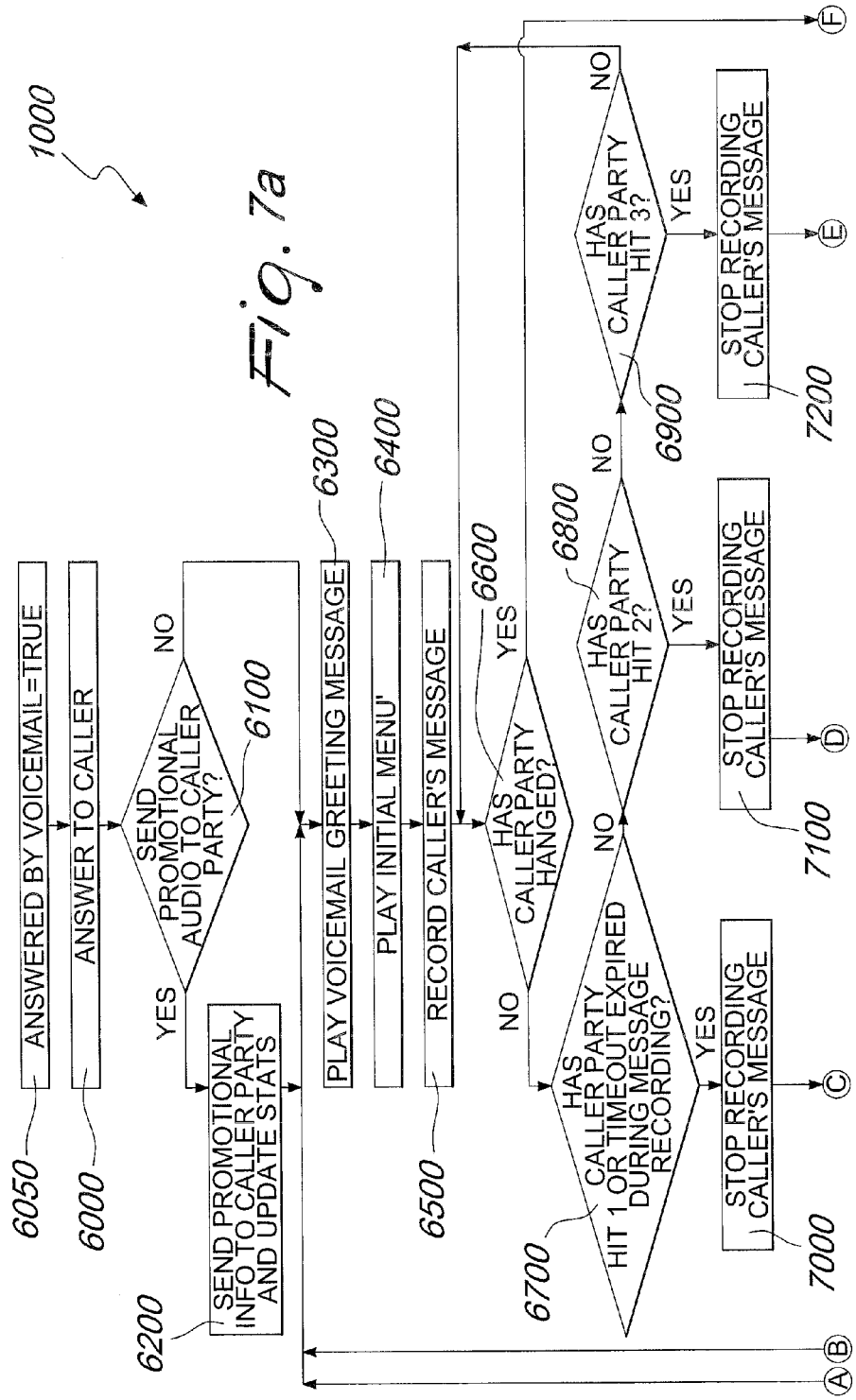
Figure 7B:
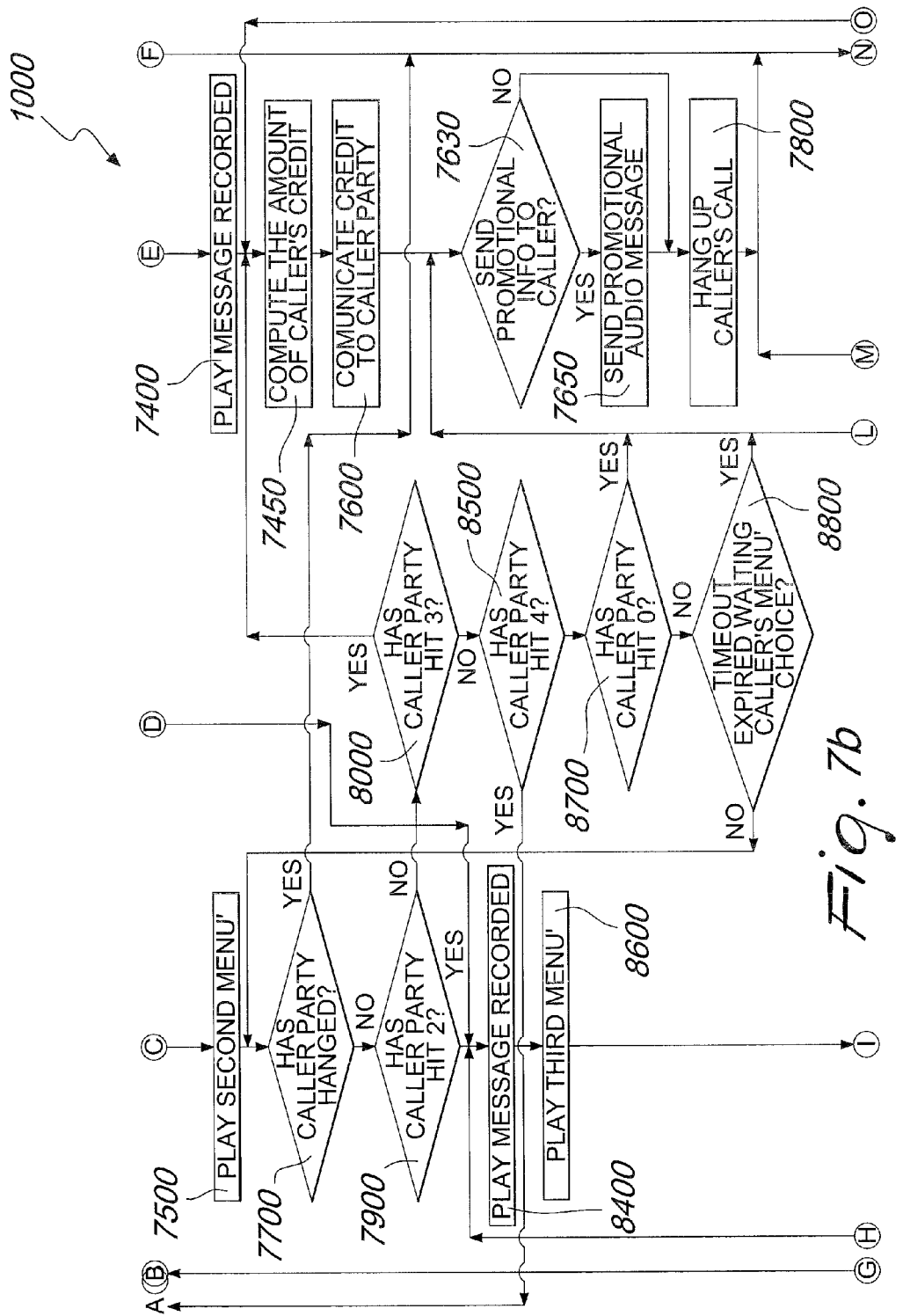
Figure 7C:
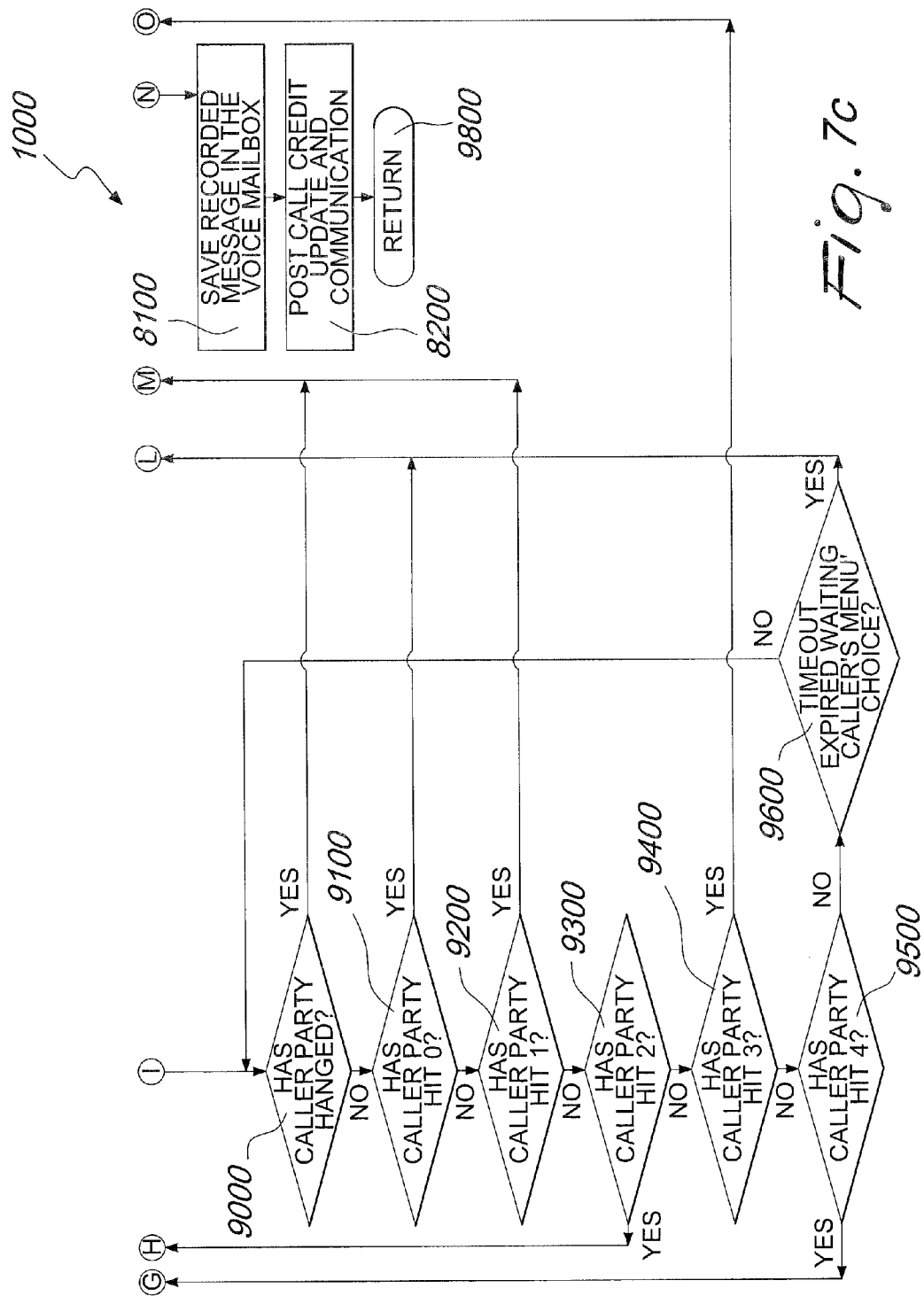

The method then proceeds with step 4300, by means of which the caller and the called party are connected. The method then proceeds with step 4400, which checks whether the called party has hung up. If the called party has not hung up, the method proceeds with step 4500, which checks whether the calling party has hung up. If the calling party has not hung up, the method returns to step 4400. If step 4400 checks that the called party has hung up, the method proceeds with step 4420, by means of which the TIME_END variable is set to the current time. The method proceeds with step 4440, which executes the "POST CALL CREDIT UPDATE AND COMMUNICATION" procedure 4440 described in FIG. 8. At the end of this procedure, the method moves on to step 4460, which returns to the main routine the CALLED PARTY HUNG UP value. If step 4500 has verified that the calling party has hung up, the method moves to step 4550, by means of which the TIME_END variable is set to the current time. The method proceeds with step 4600, which executes the "POST CALL CREDIT UPDATE AND COMMUNICATION" procedure described in FIG. 8. At the end of this procedure, the method moves on to step 4700, which returns to the main routine the CALLING PARTY HUNG UP value. FIG. 7a-c shows, in three separate parts which can be assembled according to the branches designated by the reference letters A to O, the operation of the "MANAGE VOICEMAIL AND COMMUNICATE PROMOTIONAL INFO" procedure 1000. In step 6050, the variable ANSWERED BY VOICEMAIL is set to TRUE. In step 6000, the call is answered. Step 6100 checks whether a promotional message has to be played to the caller on the basis of the information previously returned by the CLASSIFY CALLER procedure. If it has been verified that it is necessary to play a promotional message, the method proceeds with step 6200, by means of which the system plays the message.

At the end of the playback, the system updates the AudioPromotionStats table with the data related to the playback of the promotional message. At this point, both when arriving from step 6200 and whether step 6100 has verified that it is not necessary to play back a promotional message, the method proceeds with step 6300. At this point the system plays back the welcome message of the called party, which can be optionally personalized.

At the end of the playback of the welcome message, the method proceeds with step 6400, by means of which the system invites the caller to record the message after the audio signal and plays back to the calling party the first menu, which informs said calling party that at the end of the recording he can hang up or press 1 to save the message, press 2 to listen to the recorded message, press 3 to save the message and listen to the information related to the credit registered to the telephone number of the caller. In step 6500, the recording of the message of the caller begins. The method then proceeds with step 6600, which checks whether the caller has hung up.

If the caller has hung up, the method proceeds with step 8100, by means of which the message left by the caller is recorded in the mailbox of the called party. Step 8200 executes the "POST CALL CREDIT UPDATE AND COMMUNICATION" procedure indicated in FIG. 8. At this point, the method proceeds with step 9800, which returns to the main routine. If step 6600 has verified that the caller has not hung up, the method proceeds with step 6700, which checks whether the caller has pressed 1 or whether the timeout associated with the recording of the message has expired. If one of these two conditions has occurred, the method proceeds with step 7000, which interrupts the recording of the message to be left in the voicemail.

The method then moves on to step 7500, in which the second menu is played back to the caller, inviting the caller to press 2 to listen to the recorded message, 3 to save the message and listen to information related to the credit associated with the calling telephone number, 4 to record a new message, or 0 to quit. At this point, the method proceeds with step 7700, which checks whether the caller has hung up. If the caller has hung up, the method proceeds with step 8100 (already described earlier).

If step 7700 has verified that the caller has not hung up, step 7900 checks whether the caller has pressed 2. If the caller has not pressed 2, the method proceeds with step 8000, which checks whether the caller has pressed 3. If the caller has not pressed 3, the method proceeds with step 8500, which checks whether the caller has pressed 4. If the caller has not pressed 4, the method proceeds with step 8700, which checks whether the caller has pressed 0. If the caller has not pressed 0, the method proceeds with step 8800, which checks whether the timeout set for waiting for a choice by the caller has expired. If the timeout has not expired, the method returns to step 7700. If the timeout checked in step 8800 has expired, the method moves on to step 7630, which checks whether a promotional message is to be sent to the caller. If a promotional message is not to be sent, the method proceeds with step 7800, by means of which the call is dropped. Once the call has been dropped, the method proceeds with step 8100 (already described earlier). If step 7630 has verified that a promotional message is to be played, the method proceeds with step 7650, which plays a promotional message. Once the message has been played, the method proceeds with step 7800 (already described earlier). If step 8000 has verified that the caller has pressed 3, the method proceeds with step 7450, which calculates the amount of credit associated with the calling telephone number, calculated according to the following formula:

Given:

M=Margin Available (euros)

A=TIME END (seconds from Epoch, i.e., usually Jan. 1, 1970)

B=TIME START (seconds from Epoch)

D=Value of the NetInbound field of the "CALLEDNUMBERS" table, expressed in euros per second E=Percentage of M granted to the caller F=Value of previously accumulated credit (euro)

M=(A−B)*D

Caller Credit=(M*E)+F

Once the credit has been calculated, the method moves on to step 7600, by means of which the value of the calculated credit is reported to the caller. Once the credit has been reported to the customer, the method proceeds with step 7630 (already described earlier).

If step 8500 has verified that the caller has pressed 4, the method proceeds with step 8600, which plays to the caller the third menu, which invites the caller to press 1 to save the message, 2 to listen to the recorded message, 3 to save the message and listen to information related to the credit associated with the calling telephone number, 4 to record a new message, or 0 to quit. At this point, the method proceeds with step 9000, which checks whether the caller has hung up. If the caller has not hung up, the method proceeds with step 9100, which checks whether the caller has pressed 0. If the caller has not pressed 0, the method proceeds with step 9200, which checks whether the caller has pressed 1. If the caller has not pressed 1, the method proceeds with step 9300, which checks whether the caller has pressed 2. If the caller has not pressed 2, the method proceeds with step 9400, which checks whether the caller has pressed 3. If the caller has not pressed 3, the method proceeds with step 9500, which checks whether the caller has pressed 4. If the caller has not pressed 4, the method proceeds with step 9600, which checks whether the timeout set for waiting for a choice by the caller has expired. If the timeout set for waiting for a choice by the caller has not expired, the method proceeds with step 9000 (already described earlier). If step 9600 has verified that the timeout set for waiting for a choice by the caller has expired, the method proceeds with step 7630 (already described earlier). If step 9400 has verified that the caller has pressed 3, the method proceeds with step 7450 (already described earlier). If step 9300 has verified that the caller has pressed 2, the method proceeds with step 8400, by means of which the system plays the message just recorded by the caller. Once the message has been played, the method proceeds with step 8600 (already described earlier). If step 9200 has verified that the caller has pressed 1, the method proceeds with step 8100 (already described earlier). If in step 9100 the caller pressed 0, the method proceeds with step 7630 (already described earlier). If in step 9000 the caller has hung up, the method proceeds with step 8100 (already described earlier).

Previously, after the step 8500, if step 8700 has verified that the caller has pressed 0, the method proceeds with step 7630 (already described earlier).

If step 6700 has not verified that the caller pressed 1 or the timeout set for recording the message has not expired, the method proceeds with step 6800, which checks whether the caller has pressed 2. If the caller has pressed 2, the method proceeds with step 7100, which interrupts the recording of the message left by the caller. The method here proceed with step 8400 (already described earlier).

If step 6800 has verified that the caller has not pressed 2, the method proceeds with step 6900, which checks whether the caller has pressed 3. If the customer has pressed 3, the method proceeds with step 7200, which interrupts the recording of the message left by the caller. At this point, the method proceeds with step 7400, which plays the message just left by the caller. Once the message has been played, the method continues with step 7450 (already described earlier).

If step 6900 has verified that the caller has not pressed 3, the method proceeds with step 6600 (already described earlier).

FIG. 8 illustrates the operation of the "POST CALL CREDIT UPDATE AND COMMUNICATION" procedure 4600. Step 15000 checks the value of the credit acknowledged for the last call to the caller and optionally to the called party. Calculation is performed as follows:

Given:
M=Margin Available
A=TIME END (seconds from Epoch)
B=TIME START (seconds from Epoch)
C=Value of the TariffToTerminate field of the "CUSTOMERTERMINALS" table, (euros/sec)
D=Value of the NetInbound field of the "CALLEDNUMBERS" table, (euros/sec)
E=Percentage of M granted to the caller
F=Value of previously accumulated credit (euro)
G=Percentage of M granted to called party
M=(A−B)*(D−C)
Caller Credit=(M*E)+F
Called Party Credit=(M*G)+F The method then proceeds with step 15100, by means of which the value of the total credit accumulated in the virtual account CV associated with the telephone number of the caller (Credit field in the "CALLINGPARTYACCOUNTS" table) is updated. The method then proceeds with step 15200, which checks whether the calling party has hung up. If the calling party has hung up, the method proceeds with step 15300, which checks whether the call was transferred to the voicemail service. If the call has not been passed to the voicemail service, the method proceeds with step 15500, which checks whether the called party agreed to receive promotional messages. If the called party agreed to receive promotional messages, step 15700 is performed and plays the promotional message to the called party.

The method then moves on to step 15900, which disconnects the called party. The method then proceeds with step 16100, which checks whether it is necessary, on the basis of the parameters that are present in the "CALLINGPARTYDATA" table, to send an SMS message to the calling party. If an SMS message is to be sent to the calling party, step 16200 is performed, which sends the SMS message and introduces a new record in the "SMSPROMOTIONSSTATS" table. At the end of step 16200, or if step 16100 has verified that it is not necessary to send an SMS message to the calling party, the method proceeds with step 16300, which checks whether, on the basis of the parameters that are present in the "CALLINGPARTYDATA" table, it is necessary to send an e-mail message to the calling party. If it is necessary to send an e-mail message to the calling party, the method proceeds with step 16400, which sends the e-mail message and enters a new record in the "EMAILPROMOTIONSSTATS" table. At the end of step 16400, or if step 16300 has verified that it is not necessary to send an e-mail message to the calling party, the method proceeds with step 16500, which checks whether, on the basis of the parameters that are present in the "CALLINGPARTYDATA" table, it is necessary to send an IRC message to the calling party. If it is necessary to send an IRC message to the calling party, the step 16600 is performed, sending the IRC message and entering a new record in the "IMPROMOTIONSSTATS" table. At the end of step 16600, or if step 16500 has verified that it is not necessary to send an IRC message to the calling party, the method proceeds with step 16700, which checks whether, on the basis of the parameters that are present in the "CALLINGPARTYDATA" table, it is necessary to send a VOIP message to the calling party.

If it is necessary to send a VOIP message to the calling party, the method proceeds with step 16800, which sends the VOIP message and enters a new record in the "VOIPPROMOTIONSSTATS" table. At the end of step 16800, or if step 16700 has verified that it is not necessary to send a VOIP message to the calling party, the method proceeds with step 16900, which checks whether, on the basis of the parameters that are present in the "CALLINGPARTYDATA" table, it is necessary to send a message by traditional mail to the calling party.

If it is necessary to send a message by traditional mail to the calling party, the step 17000 is performed by means of which the traditional mail message is sent and a new record in the "POSTALPROMOTIONSSTATS" table is entered.

At the end of step 17000, or if in step 16900 it has been found that it is not necessary to send a traditional post message to the calling party, the procedure quits.

Going back to step 15200, if it has been found that the calling party has not hung up, the method proceeds with step 15400, which checks whether, on the basis of the parameters that are present in the "CALLINGPARTYDATA" table, it is necessary to play an audio message to the calling party. If it is necessary to play an audio message to the calling party, step 15600 is performed and plays the audio message and enters a new record in the "AUDIOPROMOTIONSSTATS" table. At the end of step 15600 or if in step 15400 it has been found that it is not necessary to play an audio message to the calling party, step 15800 is performed, by means of which the calling party is disconnected. Once the calling party has been disconnected, the step 16100 (already described earlier) is performed.

If step 15500 has verified that the called party has not agreed to receive promotional messages, or if step 15300 has verified that the system has not answered by means of the voicemail service, step 16100 (already described earlier) is performed.

In practice it has thus been found that the described system and method according to the invention provide means which are efficient for the telecommunication service Operator and also beneficial to users for overcoming the difficulties arising from the technical and regulatory inflexibilities that prevent the provision of variable tariffs at a given time, on a call by call basis, toward a given number. These difficulties are overcome simply, transparently and inexpensively by means of the described mechanism, which allows a compensation whose effects are equivalent to the sought tariff change to callers, regardless of whether they already have previously established direct relations with the operator of the called party or not.

Another object which has been achieved is to provide a new system and method for managing improved telecommunication services which allow considerable saving on advertising costs for increasing an operator's users, with consequent positive effects on customer acquisition and management costs and tariffs.

An important object which has been achieved is that of providing a new system and method for managing improved telecommunication services which facilitates a quick increase in the number of users by virtue of the dissemination, without additional means and expenses, by one's own subscribed users and/or by the operator, of the corresponding network identifiers required to be contacted and/or by virtue of the reporting of the existence of compensations which have been accrued by third parties by using the service of said operator.

The benefits of the new management system and method according to the invention are even more evident if one considers the cash flow trend and the business risk. With traditional methods, an operator must first invest in a massive communication campaign and it will reap users only afterwards. Marketing and sales costs must be borne in advance and there is no assurance that the investment will lead to the acquisition of a number of customers sufficient to cover the initial cash outlay. With the methods proposed here, the Operator minimizes initial marketing and sales costs and thus limits the initial negative cash flow. The Credit subsequently "consumed" by customers does not entail any further negative cash flow, since in this embodiment this credit is financed by the positive cash flows already received by the Operator (due to the difference between revenue and cost for allowing its own users to be reached by callers) even before they are used by the new customers. In this manner, the capital at risk for acquiring a large number of users is reduced to the capital required to acquire a much smaller initial number of customers, with an evident reduction of business risk.

Another object achieved by the invention is to provide a new system and method for the management of improved telecommunication services which despite being secure to use also allow reliable identification of the users who access the services or wish to access them.

Another object achieved by the invention is to provide a third-party payment service which benefits from the limited credit checking costs typical of systems based on prepayment by users, but at the same time which does not require prior contact between the operator and the user or, even more so, direct contact between them to make a prepayment, which can be expensive.

The "virtual accounts" CV accessible to the end users in fact also have the benefit of facilitating payment operations of any kind if the Operator acts as an intermediary for paying third parties on behalf of the user. For example, the Operator can provide a third-party payment service similar to PayPal®, or make an agreement with a provider of a service of this kind, by drawing from the "Virtual Accounts" CV to collect the funds required for payment, optionally with the authorization of the registrant of the "Virtual Account" CV. The fact that the "Virtual Account" CV is created with negligible costs and can be accessed easily via data communications systems makes it more convenient to use a similar system also for micropayments.

Differently from other incentive systems based on Credits, the Operator runs no risk linked to the cost of the Credit offered to the customer, since in actual fact the Credit credited to the "Virtual Account" associated with the network identifier originating communications is usually, although variations are possible, equal to or lower than the difference already cashed in by the operator between what the operator invoices (which in turn is paid indirectly by the calling party) and the cost borne by the operator in each instance to reach the called party. The indirect source of credit is the calling party himself, not the Operator. In this way, the Operator acquires new customers by offering them a monetary benefit which has already been financed by such prospective clients.

The method and the system conceived are susceptible of modifications and variations which are evident to the person skilled in the art and are all within the scope of the appended claims.

All the details, such as the described means of the system and the means for implementing the methods, devices, routines and others, may further be replaced with other technically equivalent ones and depending on the state of the art, selected for example, but not only, depending on the type of terminals most used in a geographical region or country and on the rules and standards in force at a given time.

All these variations, which are obvious to the person skilled in the art, are understood to be comprised within the protective scope of the appended claims.

Where technical features mentioned in the claims are followed by reference signs, those reference signs have been included for the sole purpose of increasing the intelligibility of the claims and accordingly such reference signs do not have any limiting effect on the interpretation of each element identified by way of example by such reference signs.

Annex

CALLED NUMBERS DATABASE

| TABLE CALLEDNUMBERS | |
|---|---|
| CUSTOMERID | NUMBER |
| CALLEDNUMBER | STRING |
| VOICEMAIL | BOOL |
| NETINBOUND | NUMBER |

FIELD DESCRIPTION
CUSTOMERID: SUBSCRIBED USER IDENTIFICATION CODE
CALLED NUMBER: TELEPHONE NUMBER ASSIGNED TO THE SUBSCRIBER
NETINBOUND: VALUE WHICH CAN BE INVOICED BY OPERATOR TO OTHER OPERATORS FOR TERMINATION OF CALLS TOWARD CALLEDNUMBER

| TABLE CUSTOMERTERMINALS | |
|---|---|
| CUSTOMERID | NUMBER |
| TERMINALTYPE | STRING |
| TERMINALNUMBER | BOOL |
| AVAILABLE | NUMBER |
| USERPREFERENCE | NUMBER |
| TARIFFTOTERMINATE | STRING |

FIELD DESCRIPTION: MULTIPLE RECORDS CAN MATCH A GIVEN CUSTOMERID, EACH RECORD CONTAINING THE DETAILS OF A SPECIFIC TERMINAL ON WHICH THE SUBSCRIBER CAN BE REACHED THE SUBSCRIBER CAN CHANGE OR EXTEND THE LIST OF TERMINALS VIA WEB, IVR, MAIL, SMS INTERFACES ETC.
CUSTOMERID: SUBSCRIBED USER IDENTIFICATION CODE
TERMINALTYPE: TYPE OF TERMINAL (MOBILE/FIXED/VOIP . . . )
TERMINALNUMBER: TERMINAL IDENTIFIER OR NUMBER
AVAILABLE: INDICATES WHETHER THE USER IS AVAILABLE TO RECEIVE CALLS ON THE TERMINAL. POSSIBLE VALUES ARE YES/NO/UNDEFINED
USERPREFERENCE: LEVEL OF PREFERENCE EXPRESSED BY SUBSCRIBER TO RECEIVE A CALL ON THE TERMINAL.
TARIFFTOTERMINATE: COST INCURRED BY THE OPERATOR FOR TERMINATING CALLS TOWARD TERMINALNUMBER

CALLING PARTY DATABASE

| TABLE CALLINGPARTYDATA | |
|---|---|
| CALLERID | STRING |
| CALLEDACCOUNT | NUMBER |
| AUDIODND | BOOL |
| MAILDND | BOOL |
| SMSDND | BOOL |
| IRCDND | BOOL |
| VOIPDND | BOOL |
| EMAILADDRESS | STRING |
| SMSADDRESS | STRING |
| IRCADDRESS | STRING |
| VOIPADDRESS | STRING |
| POSTADDRESS | STRING |

FIELD DESCRIPTION
CALLERID: NUMBER OF CALLER
CALLEDACCOUNT: VIRTUAL ACCOUNT NUMBER
AUDIODND: DOES CALLER WISH TO BE CONTACTED BY AUDIO?
MAILDND: DOES CALLER WISH TO BE CONTACTED BY MAIL?
SMSDND: DOES CALLER WISH TO BE CONTACTED BY SMS?
IRCDND: DOES CALLER WISH TO BE CONTACTED BY IRC?
VOIPDND: DOES CALLER WISH TO BE CONTACTED BY VOIP?
POSTDND: DOES CALLER WISH TO BE CONTACTED BY TRADITIONAL POST?
EMAILADDRESS: E-MAIL ADDRESS FOR CONTACT
SMSADDRESS: TELEPHONE NUMBER FOR CONTACT BY SMS
IRCADDRESS: IRC ACCOUNT FOR CONTACT
VOIPADDRESS: VOIP TELEPHONE NUMBER FOR CONTACT
POSTALADDRESS: TRADITIONAL MAIL ADDRESS FOR CONTACT

| TABLE CALLINGPARTYACCOUNTS | |
|---|---|
| CALLERID | STRING |
| CALLERACCOUNT | NUMBER |
| CREDIT | NUMBER |
| CUSTOMERID | NUMBER |

FIELD DESCRIPTION
CALLERID: NUMBER OF CALLER
CALLERACCOUNT: VIRTUAL ACCOUNT NUMBER
CREDIT: VALUE OF CREDIT AVAILABLE ON VIRTUAL ACCOUNT
CUSTOMERID: IDENTIFICATION CODE OF SUBSCRIBED USER (SET IF VIRTUAL ACCOUNT HAS BEEN ASSOCIATED WITH AN ENTITY WHICH IS A SUBSCRIBED USER)

| TABLE AUDIOPROMOTIONSSTATS | |
|---|---|
| CALLERACCOUNT | NUMBER |
| AUDIOCONTENT | BLOB |
| TIMESTAMP | DATETIME |

FIELD DESCRIPTION
CALLERACCOUNT: VIRTUAL ACCOUNT NUMBER
AUDIOCONTENT: CONTENT OF SENT AUDIO MESSAGE
TIMESTAMP: DATE AND TIME WHEN AUDIO MESSAGE WAS SENT

| TABLE EMAILPROMOTIONSSTATS | |
|---|---|
| CALLERACCOUNT | NUMBER |
| EMAILADDRESS | STRING |
| EMAILCONTENTS | BLOB |
| TIMESTAMP | DATETIME |
| OPENED | BOOL |
| CLICKED | BOOL |
| REPLIED | BOOL |

FIELD DESCRIPTION
CALLERACCOUNT: VIRTUAL ACCOUNT NUMBER
EMAILADDRESS: E-MAIL ADDRESS TO WHICH THE PROMOTIONAL MESSAGE WAS SENT
EMAILCONTENT: CONTENT OF E-MAIL MESSAGE
TIMESTAMP: DATE AND TIME WHEN E-MAIL MESSAGE WAS SENT
OPENED: WAS E-MAIL MESSAGE OPENED?
CLICKED: DID RECIPIENT CLICK ON LINKS PRESENT IN THE E-MAIL MESSAGE?
REPLIED: DID RECIPIENT ANSWER THE E-MAIL MESSAGE?

| TABLE SMSPROMOTIONSSTATS | |
|---|---|
| CALLERACCOUNT | NUMBER |
| PHONENUMBER | STRING |
| SMSCONTENTS | STRING |
| TIMESTAMP | DATETIME |
| RECEIVED | BOOL |
| REPLIED | BOOL |

FIELD DESCRIPTION
CALLERACCOUNT: VIRTUAL ACCOUNT NUMBER
PHONENUMBER: TELEPHONE NUMBER TO WHICH THE PROMOTIONAL SMS MESSAGE WAS SENT
SMSCONTENT: CONTENT OF E-MAIL MESSAGE
TIMESTAMP: DATE AND TIME WHEN SMS MESSAGE WAS SENT
RECEIVED: DID RECIPIENT RECEIVE THE SMS MESSAGE?
REPLIED: DID RECIPIENT ANSWER THE SMS MESSAGE?

| TABLE IMPROMOTIONSSTATS | |
|---|---|
| CALLERACCOUNT | NUMBER |
| IRCADDRESS | STRING |
| MESSAGECONTENTS | BLOB |
| TIMESTAMP | DATETIME |
| REPLIED | BOOL |

FIELD DESCRIPTION
CALLERACCOUNT: VIRTUAL ACCOUNT NUMBER
IRCADDRESS: IRC ADDRESS TO WHICH THE PROMOTIONAL MESSAGE WAS SENT
MESSAGECONTENT: CONTENT OF SENT IRC MESSAGE
TIMESTAMP: DATE AND TIME WHEN IRC MESSAGE WAS SENT
REPLIED: DID RECIPIENT ANSWER THE IRC MESSAGE?

| TABLE VOIPPROMOTIONSSTATS | |
|---|---|
| CALLERACCOUNT | NUMBER |
| VOIPADDRESS | STRING |
| EMAILCONTENTS | BOOL |
| TIMESTAMP | DATETIME |

FIELD DESCRIPTION
CALLERACCOUNT: VIRTUAL ACCOUNT NUMBER
VOIPADDRESS: VOIP NUMBER TO WHICH THE PROMOTIONAL MESSAGE WAS SENT
MESSAGECONTENT: CONTENT OF SENT MESSAGE
TIMESTAMP: DATE AND TIME WHEN MESSAGE WAS SENT

| TABLE POSTALPROMOTIONSSTATS | |
|---|---|
| CALLERACCOUNT | NUMBER |
| POSTALADDRESS | STRING |
| LETTERSENT | BOOL |
| TIMESTAMP | DATETIME |

FIELD DESCRIPTION
CALLERACCOUNT: VIRTUAL ACCOUNT NUMBER
POSTALADDRESS: MAIL ADDRESS TO WHICH THE PROMOTIONAL MESSAGE WAS SENT
LETTERSENT: WAS MESSAGE SENT?
TIMESTAMP: DATE AND TIME WHEN MESSAGE WAS SENT

The invention claimed is:

1. A method for creating a variable and progressively incremental group of users of telecommunication services provided by an operator by assigning subscriber network identifiers (IS), comprising the steps for:
   a) acquiring an initial number of subscribed users;
   b) assigning to each subscribed user of said initial group of subscribed users respective subscriber network identifiers (IS);
   c) notifying said subscriber network identifiers (IS) to current and potential users;
   d) monitoring inbound communications toward said subscriber network identifiers (IS) in order to identify inbound network identifiers originating communications (IC);
   e) creating, as a consequence of a communication originated from a said network identifier originating communications (IC) toward at least one of the assigned subscriber network identifiers (IS), a virtual account (CV) which is registered to said network identifier originating communications (IC); and
   f) informing users of telecommunication services of the existence and/or balance of the virtual account (CV) registered to the network identifier originating communications (IC).

2. The method according to claim 1, wherein step f) comprises informing of the existence and/or balance of the virtual account (CV) registered to the network identifier originating communications (IC) at least the user of telecommunication services to which said network identifier originating communications is assigned (IC).

3. The method according to claim 1, wherein said step b) for assigning subscriber network identifiers (IS) comprises assigning to the subscribed user a single subscriber network identifier (IS) which allows the termination of communications toward it on any one of a plurality of telecommunication terminals.

4. The method according to claim 3, comprising the steps for:
- g) selecting, by virtue of the means for selective termination of inbound communications, the terminals on which the inbound communication is to terminate according to a preset algorithm (AR0);
- h) selecting, by virtue of the means for selective termination of inbound communications, among said terminals selected in the preceding step, only the telecommunications terminals on which the subscribed user can receive the inbound communication;
- i) terminating said inbound communication on a telecommunication terminal among the ones selected in the preceding step.

5. The method according to claim 4, wherein said preset algorithm (AR0) performs operations to minimize termination costs by establishing a sequence of priorities on the basis of termination costs.

6. The method according to claim 4, further comprising the steps for:
- j) calculating, by means of tariff calculation means, a difference between what can be and/or is invoiced by the operator that provides the telecommunication services for a communication and the cost to the operator for terminating said communication.

7. The method according to claim 6, comprising the step for:
- k) crediting to said virtual account (CV) funds which correspond to all or part of the difference calculated in said calculation step (j), a fixed value assigned by the operator for each minute of conversation that occurs as a consequence of the inbound communication, or a fixed value established arbitrarily by the operator regardless of whether a communication occurs or not.

8. The method according to claim 7, comprising the step for informing the user who originates the communication, by virtue of said information means, of the amount of the credit that is the result of the funds credited to the virtual account (CV).

9. The method according to claim 8, comprising the step m) for increasing the number of subscribed users with new users to which new subscriber network identifiers (IS) are assigned according to a new step b); and then continuing with a new step c) for notifying the newly assigned subscriber network identifiers (IS) to current and potential users.

10. The method according to claim 9, wherein steps b)-m) can be repeated cyclically whenever an inbound communication from a network identifier originating communications (IC) occurs toward one of the subscribed users to which a subscriber network identifier (IS) is assigned.

11. The method according to claim 9, comprising: the step n) for communicating to the operator, on the part of the subscribed user to which a single subscriber network identifier is registered, a list of the telecommunications terminals on which he will be reachable by means of said single subscriber network identifier (IS); and the step o) for associating said telecommunication terminals to the single subscriber network identifier (IS), the steps n) and o) being executable before the beginning of each step c).

12. The method according to claim 11, wherein step e) comprises creating a virtual account (CV) which is registered to a potential user outside the group of subscribed users even before said user originates the communication toward a subscriber network identifier (IS).

13. The method according to claim 12, wherein step e) provides for the creation of virtual accounts (CV) which belong to subscriber network identifiers (IS) of the same operator.

14. The method according to claim 13, wherein step e) is followed by the subsequent steps f)-i), followed by a step p) for applying a discount to the bill of the subscribed user who originates a communication for a value which is lower than, or equal to, the funds credited on the virtual account (CV) of the subscribed user.

15. The method according to claim 14, further comprising the step for
- q) receiving orders to debit to/credit from said virtual account (CV) on the part of entities.

16. The method according to claim 15, comprising the step for
- r) establishing to which of said entities said network identifier originating communications (IC) is actually associable.

17. The method according to claim 16, comprising the step for
- s) rendering interchangeable, inside the central unit of the telecommunication service management system, all network identifiers originating communications (IC) and/or subscriber network identifiers (IS) which are equivalent.

18. The method according to claim 1, comprising the step of assigning an appropriately provided operator service network identifier (IO) and the step of reporting to a user of telecommunication services which originates a communication toward said appropriately provided operator service network identifier (IO) the existence and/or balance of said virtual account (CV) registered to the network identifier originating communications (IC).

19. The method according to claim 1, wherein step f) comprises employing information means which are adapted to inform, by virtue of audio and/or spoken and/or visual messages, the user of the existence and/or balance of said virtual account (CV), said information means comprising a specialized routine (AR3) loaded in an electronic computer.

20. The method according to claim 1, wherein step e) comprises employing specialized routines (AR1, AR5, AR6) which are loaded in a central unit.

* * * * *